US012404479B2

(12) United States Patent
Tang et al.

(10) Patent No.: US 12,404,479 B2
(45) Date of Patent: *Sep. 2, 2025

(54) LAUNDRY DETERGENT COMPOSITION CONTAINING GRAFT COPOLYMER AND BENEFIT AGENT

(71) Applicant: The Procter & Gamble Company, Cincinnati, OH (US)

(72) Inventors: Ming Tang, Beijing (CN); Renae Dianna Fossum, Middletown, OH (US); Kejing Du, Beijing (CN); Xiaoyi Ren, Beijing (CN); Zhen Zhong, Beijing (CN); Haiyan Song, Beijing (CN); Karen Hussong Strader, Springboro, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/321,834

(22) Filed: May 23, 2023

(65) Prior Publication Data

US 2024/0010954 A1 Jan. 11, 2024

(30) Foreign Application Priority Data

Jul. 11, 2022 (WO) ................ PCT/CN2022/104849

(51) Int. Cl.

| | |
|---|---|
| ***C11D 1/00*** | (2006.01) |
| ***C11D 1/02*** | (2006.01) |
| ***C11D 3/37*** | (2006.01) |
| ***C11D 3/50*** | (2006.01) |

(52) U.S. Cl.

CPC .......... *C11D 3/3788* (2013.01); *C11D 3/3707* (2013.01); *C11D 3/50* (2013.01); *C11D 2111/12* (2024.01)

(58) Field of Classification Search

CPC .... C11D 1/00; C11D 1/02; C11D 3/37; C11D 3/3707; C11D 3/3746; C11D 3/50

See application file for complete search history.

(56) References Cited

U.S. PATENT DOCUMENTS

| | | | | |
|---|---|---|---|---|
| 4,464,281 A | 8/1984 | Rapisarda | | |
| 4,746,456 A | 5/1988 | Kud | | |
| 4,846,994 A | 7/1989 | Kud | | |
| 4,846,995 A | 7/1989 | Kud et al. | | |
| 4,904,408 A | 2/1990 | Kud et al. | | |
| 5,049,302 A | 9/1991 | Holland | | |
| 5,500,154 A | 3/1996 | Bacon et al. | | |
| 5,780,404 A | 7/1998 | Bacon | | |
| 5,911,979 A | 6/1999 | Midha | | |
| 6,703,008 B2 | 3/2004 | Carballada | | |
| 6,827,795 B1 | 12/2004 | Kasturi | | |
| 7,728,063 B2 | 6/2010 | Brodt et al. | | |
| 8,143,209 B2 | 3/2012 | Boeckh | | |
| 8,227,381 B2 | 7/2012 | Rodrigues et al. | | |
| 8,247,368 B2 | 8/2012 | Danziger | | |
| 8,497,234 B2 | 7/2013 | Mayer et al. | | |
| 8,519,060 B2 | 8/2013 | Boeckh | | |
| 8,716,208 B2 | 5/2014 | Meek | | |
| 8,846,598 B2 | 9/2014 | Lant et al. | | |
| 8,859,484 B2 | 10/2014 | Hulskotter et al. | | |
| 9,493,725 B2 | 11/2016 | Vinson et al. | | |
| 9,493,726 B2 | 11/2016 | Vinson et al. | | |
| 9,528,076 B2 | 12/2016 | Labeque | | |
| 9,850,452 B2 | 12/2017 | Fossum et al. | | |
| 11,186,805 B2 * | 11/2021 | Fossum | ................ | C11D 3/3788 |
| 11,326,129 B2 * | 5/2022 | Fossum | ................ | C11D 3/3776 |
| 11,820,960 B2 | 11/2023 | Dihora et al. | | |
| 11,891,589 B2 * | 2/2024 | Fossum | ................ | C08F 283/06 |
| 2002/0010105 A1 | 1/2002 | Bacon et al. | | |
| 2003/0095944 A1 | 5/2003 | Midha | | |
| 2003/0119709 A1 | 6/2003 | Scheper | | |
| 2003/0186833 A1 | 10/2003 | Huff | | |
| 2005/0273942 A1 | 12/2005 | Ferguson et al. | | |
| 2005/0273943 A1 | 12/2005 | Hunter | | |
| 2005/0273944 A1 | 12/2005 | Ferguson et al. | | |
| 2005/0277563 A1 | 12/2005 | Ferguson et al. | | |
| 2006/0270582 A1 | 11/2006 | Boeckh et al. | | |
| 2007/0089244 A1 | 4/2007 | Penninger | | |
| 2007/0281879 A1 | 12/2007 | Sharma | | |
| 2008/0045441 A1 | 2/2008 | Schmiedel | | |
| 2008/0300158 A1 | 12/2008 | Schutz | | |
| 2009/0081755 A1 | 3/2009 | Schmiedel et al. | | |
| 2009/0312222 A1 | 12/2009 | Ferguson et al. | | |
| 2010/0004154 A1 | 1/2010 | Detering | | |
| 2010/0144958 A1 | 6/2010 | Findlay | | |
| 2010/0197550 A1 | 8/2010 | Bettiol | | |
| 2010/0216684 A1 | 8/2010 | Ferguson | | |
| 2011/0107524 A1 | 5/2011 | Chieffi et al. | | |

(Continued)

FOREIGN PATENT DOCUMENTS

| | | |
|---|---|---|
| AU | 3714200 A | 9/2000 |
| CA | 2329235 A1 | 11/1999 |

(Continued)

OTHER PUBLICATIONS

PCT Search Report and Written Opinion for PCT/CN2022/104849 dated Dec. 8, 2022, 11 pages.

All Office Actions; U.S. Appl. No. 18/312,623, filed May 5, 2023.

All Office Actions; U.S. Appl. No. 18/326,100, filed May 31, 2023.

All Office Actions; U.S. Appl. No. 18/326,089, filed May 31, 2023.

Unpublished U.S. Appl. No. 18/312,623, filed May 5, 2023 to Ming Tang et al.

Unpublished U.S. Appl. No. 18/326,100, filed May 31, 2023 to Giulia Ottavia Bianchetti et al.

(Continued)

*Primary Examiner* — Brian P Mruk

(74) *Attorney, Agent, or Firm* — Andrew J. Mueller

(57) ABSTRACT

A laundry detergent composition containing a graft copolymer and a benefit agent.

16 Claims, No Drawings

(56) References Cited

U.S. PATENT DOCUMENTS

| | | | |
|---|---|---|---|
| 2011/0143990 | A1 | 6/2011 | Boutique |
| 2011/0152161 | A1 | 6/2011 | Murkunde |
| 2011/0260101 | A1 | 10/2011 | Rittig |
| 2012/0036651 | A1 | 2/2012 | Frankenbach |
| 2012/0227196 | A1 | 9/2012 | Mukherjee |
| 2013/0150277 | A1 | 6/2013 | Fischer |
| 2013/0296218 | A1 | 11/2013 | Wang et al. |
| 2013/0326824 | A1 | 12/2013 | Somerville et al. |
| 2015/0038396 | A1 | 2/2015 | Tantawy |
| 2015/0111285 | A1 | 4/2015 | Raja Abdul Rahman |
| 2015/0203795 | A1 | 7/2015 | Miracle |
| 2015/0203796 | A1 | 7/2015 | Miracle |
| 2016/0010032 | A1 | 1/2016 | Tan et al. |
| 2016/0090551 | A1 | 3/2016 | Fossum et al. |
| 2016/0319225 | A1 | 11/2016 | Lant et al. |
| 2016/0348037 | A1 | 12/2016 | Findlay et al. |
| 2016/0362644 | A1 | 12/2016 | Meine et al. |
| 2017/0009402 | A1 | 1/2017 | Mohammadi et al. |
| 2018/0037848 | A1 | 2/2018 | Schubert |
| 2018/0072968 | A1 | 3/2018 | Schubert et al. |
| 2019/0048297 | A1 | 2/2019 | Van Elsen et al. |
| 2019/0169533 | A1 | 6/2019 | Zerhusen et al. |
| 2019/0169777 | A1 | 6/2019 | Zerhusen et al. |
| 2019/0225914 | A1 | 7/2019 | Stenger et al. |
| 2019/0390142 | A1* | 12/2019 | Fossum ................ C11D 3/3707 |
| 2020/0369986 | A1 | 11/2020 | Hulskotter |
| 2021/0071107 | A1 | 3/2021 | Tang et al. |
| 2021/0189293 | A1 | 6/2021 | Fossum et al. |
| 2021/0189294 | A1 | 6/2021 | Fossum et al. |
| 2022/0049191 | A1 | 2/2022 | Fossum et al. |
| 2022/0056380 | A1 | 2/2022 | Fossum |
| 2022/0235294 | A1 | 7/2022 | Fossum et al. |
| 2022/0411718 | A1 | 12/2022 | Adriaenssens et al. |
| 2022/0411722 | A1 | 12/2022 | Barbero et al. |
| 2023/0002702 | A1 | 1/2023 | Barbero et al. |

FOREIGN PATENT DOCUMENTS

| | | | |
|---|---|---|---|
| CN | 103922944 | A | 7/2014 |
| DE | 202006019521 | U1 | 3/2007 |
| EP | 0285038 | A2 | 10/1988 |
| EP | 0439316 | A2 | 7/1991 |
| EP | 0330345 | B1 | 5/1995 |
| EP | 1072673 | A2 | 1/2001 |
| EP | 2009175 | A2 | 12/2008 |
| EP | 3330345 | A1 | 6/2018 |
| EP | 3330348 | A1 | 6/2018 |
| EP | 3126478 | B1 | 9/2018 |
| EP | 3375854 | A1 | 9/2018 |
| JP | 2001106743 | A | 4/2001 |
| JP | 2008138014 | A | 6/2008 |
| WO | 9731094 | A1 | 8/1997 |
| WO | 9922697 | A1 | 5/1999 |
| WO | 0018873 | A1 | 4/2000 |
| WO | 2001005874 | A1 | 1/2001 |
| WO | 0205766 | A2 | 1/2002 |
| WO | 2002005766 | A2 | 1/2002 |
| WO | 0219976 | A1 | 3/2002 |
| WO | 2009077255 | A1 | 6/2009 |
| WO | 2009095823 | A1 | 8/2009 |
| WO | 2011075426 | A1 | 6/2011 |
| WO | 2012004134 | A1 | 1/2012 |
| WO | 2018034664 | A1 | 2/2018 |
| WO | 2018055114 | A1 | 3/2018 |
| WO | 2019075230 | A1 | 4/2019 |
| WO | 2019108714 | A1 | 6/2019 |
| WO | 2020005476 | A1 | 1/2020 |
| WO | 2020237258 | A1 | 11/2020 |
| WO | 2021067984 | A1 | 4/2021 |
| WO | 2021127697 | A1 | 6/2021 |
| WO | 2023017061 | A1 | 2/2023 |

OTHER PUBLICATIONS

Unpublished U.S. Appl. No. 18/326,089, filed May 31, 2023 to Ming et al.

All Office Actions, U.S. Appl. No. 16/018,235, filed Jun. 26, 2018.

All Office Actions; U.S. Appl. No. 17/717,173, filed Apr. 11, 2022.

All Office Actions, U.S. Appl. No. 16/722,492, filed Dec. 20, 2019.

All Office Actions; U.S. Appl. No. 17/846,336, filed Jun. 22, 2022.

All Office Actions; U.S. Appl. No. 17/847,488, filed Jun. 23, 2022.

All Office Actions; U.S. Appl. No. 17/512,240), filed Oct. 27, 2021.

BASF, "Lutensol Surfactants Product Guide [Brochure]", online link "https://assets-global.website-files.com/5fc922269c5ed09aea1f7c22/60dc560c58d63355794e0b08_Lutensol%20Brochure12012020.pdf", Year:2020, p. 32.

CAS Registry No. 61788-90-7, online retrieved from "https://scifinder-n.cas.org/searchDetail/substance/67408300cbec9c3af5539fea/substance Details", No. known date, p. 1.

Singh, Sudhir Kumar et al. "Amine Oxides: A Review", J. Oleo. Sci., Online link "https://www.jstage.jst.go.jp/article/jos/55/3/55_3_99/_article", vol. 55, Year: 2006, pp. 99-119.

* cited by examiner

LAUNDRY DETERGENT COMPOSITION CONTAINING GRAFT COPOLYMER AND BENEFIT AGENT

FIELD OF THE INVENTION

The present application relates to a laundry detergent composition containing a graft copolymer and a benefit agent.

BACKGROUND OF THE INVENTION

As detergent products are evolving, consumer needs in the term of cleaning have been well met. However, there are still some other unmet consumer needs in the field of laundry. Particularly, the unmet needs include additional benefits for fabrics after washing, e.g. a delightful scent, brightening, de-germing, anti-malodor, softening, and insect repelling. In order to achieve the above benefits, it is known that many benefit agents including fragrances, brighteners, dyes, insect repellants, silicones, waxes, vitamins, fabric softening agents, enzymes, and anti-bacterial agents can be added into laundry products.

However, these additional benefits provided by adding such benefit agents are often unsatisfactory. Accordingly, it may be desirable to have technologies to improve the efficacy of benefit agents on fabrics.

SUMMARY OF THE INVENTION

It is a surprising and unexpected discovery of the present application that the combination of a graft copolymer and a benefit agent in a detergent formulation can deliver a significantly improved efficacy of the benefit agent compared to the detergent formulation without the graft copolymer.

Correspondingly, included herein is a laundry detergent composition, comprising:

1) from about 0.01% to about 0.75%, by weight of the composition, of a graft copolymer comprising:
   a) polyalkylene oxide which has a number average molecular weight of from 1000 to 20,000 Daltons and is based on ethylene oxide, propylene oxide, butylene oxide or mixtures thereof;
   b) N-vinylpyrrolidone; and
   c) vinyl ester derived from a saturated monocarboxylic acid containing from 1 to 6 carbon atoms and/or a methyl or ethyl ester of acrylic or methacrylic acid;

wherein the weight ratio of (a):(b) is from 1:0.1 to 1:2, and wherein the amount, by weight, of (a) is greater than the amount of (c);
2) from about 0.001% to about 10%, by weight of the composition, of a benefit agent selected from the group consisting of perfumes, insect repellants, silicones, waxes, lubricants, vitamins, fabric softening agents, anti-bacterial agents, skin health agents and mixtures thereof.

The graft polymer may be, for example, a) the polyalkylene oxide comprises and preferably consists of ethylene oxide units or ethylene oxide units and propylene oxide units, and c) the vinyl ester comprises and preferably consists of vinyl acetate.

In one embodiment according to the present application, the polyalkylene oxide has a number average molecular weight of from 1000 to 20,000 Daltons.

In one embodiment according to the present application, in the graft polymer, the weight ratio of (a):(c) is from 1.0:0.1 to 1.0:0.99, preferably from 1.0:0.3 to 1.0:0.9.

In one embodiment according to the present application, in the graft polymer, from 1.0 mol % to 60 mol %, preferably from 20 mol % to 60 mol %, more preferably from 30 mol % to 50 mol % of the grafted-on monomers of component (c) are hydrolyzed.

In one embodiment according to the present application, the graft polymer has a weight average molecular weight of from 4,000 Da to 100,000 Da, preferably from 5,000 Da to 100,000 Da, more preferably from 5,000 Da to 50,000 Da, most preferably from 8,000 Da to 20,000 Da.

In one embodiment according to the present application, the composition comprises:

from about 0.01% to about 0.75%, preferably from about 0.03% to about 0.65%, more preferably from about 0.05% to about 0.50%, and most preferably from about 0.1% to about 0.29%, for example, 0.1%, 0.15%, 0.17%, 0.20%, 0.21%, 0.22%, 0.23%, 0.24%, 0.25%, 0.26%, 0.27%, 0.28%, 0.29%, 0.30%, 0.35%, 0.40%, 0.45%, 0.50%, 0.55%, 0.60%, 0.65%, 0.70%, 0.75% or any ranges therebetween, by weight of the composition, of the graft copolymer, and/or from about 0.01% to about 8%, about 0.001% to about 5%, preferably from about 0.005% to about 3%, more preferably from about 0.008% to about 2%, and most preferably from about 0.01% to about 1%, by weight of the composition, of the benefit agent.

In one embodiment according to the present application, the benefit agent may be perfume, preferably perfume having a C log P of from about −2.0 and to about 8.0, more preferably perfume having a C log P of from about 1.0 and to about 6.0; more preferably perfume having a C log P of from about 1.0 and to about 4.0. Preferably, the benefit agent may be hydrophobic.

In one embodiment according to the present application, the composition further comprises from 0.1% to 20%, preferably from 0.5% to 15%, more preferably from 1% to 10%, most preferably from 2% to 8%, by weight of the composition, of $C_6$-$C_{20}$ linear alkylbenzene sulfonate (LAS), and/or from 0.1% to 20%, preferably from 0.5% to 15%, more preferably from 1% to 10%, most preferably from 2% to 8%, by weight of the composition, of $C_6$-$C_{20}$ alkyl alkoxy sulfates (AAS), and/or from 0.1% to 20%, preferably from 0.5% to 15%, more preferably from 1% to 10%, most preferably from 2% to 8%, by weight of the composition, of $C_6$-$C_{20}$ alkyl sulfates (AS).

In one embodiment according to the present application, the composition further comprises from 0.01% to 10%, preferably from 0.1% to 5%, more preferably from 0.2% to 4%, most preferably from 0.3% to 3%, for example, 0.5%, 1%, 2%, 3%, 4%, 5% or any ranges thereof, by weight of the composition, of a fatty acid.

In one embodiment according to the present application, the composition may further comprise a treatment adjunct which may be preferably selected from the group consisting of a surfactant system, fatty acids and/or salts thereof, soil release polymers, hueing agents, builders, chelating agents, dye transfer inhibiting agents, dispersants, enzyme stabilizers, anti-oxidants, catalytic materials, bleach catalysts, bleach activators, polymeric dispersing agents, soil removal/anti-redeposition agents, polymeric grease cleaning agents, amphiphilic copolymers, suds suppressors, dyes, hueing agents, lubricants, skin health agents, structure elasticizing agents, carriers, fillers, hydrotropes, solvents, anti-microbial agents and/or preservatives, neutralizers and/or pH adjusting agents, processing aids, rheology modifiers and/or structurants, opacifiers, pearlescent agents, pigments, anti-corrosion and/or anti-tarnishing agents, and mixtures thereof.

In one embodiment according to the present application, said composition is in the form of a liquid composition, a granular composition, a single-compartment pouch, a multi-compartment pouch, a sheet, a pastille or bead, a fibrous article, a tablet, a bar, flake, or a mixture thereof.

In another aspect, the present application is related to the use of a laundry detergent composition according to the present application for improving the efficacy of the benefit agent onto fabrics.

In another aspect, the present application is related to a method of laundering fabric, comprising the steps of:

1) diluting a laundry detergent composition comprising a graft copolymer and a benefit agent with water or an aqueous solution by an order ranging from 500 to 5000 times (preferably from 900 to 3000 times) by weight to form a laundry washing liquor having a Through-The-Wash (TTW) dosage of the graft copolymer ranging from 0.2 to 90 ppm, preferably from 0.4 to 60 ppm, more preferably from 0.6 to 40 ppm, most preferably from 0.8 to 30 ppm, e.g. 28 ppm, 26 ppm, 24 ppm, 22 ppm, 20 ppm, 18 ppm, 15 ppm or any ranges thereof, wherein the graft copolymer comprises:
   a) polyalkylene oxide which has a number average molecular weight of from 1000 to 20,000 Daltons and is based on ethylene oxide, propylene oxide, butylene oxide or mixtures thereof;
   b) N-vinylpyrrolidone; and
   c) vinyl ester derived from a saturated monocarboxylic acid containing from 1 to 6 carbon atoms and/or a methyl or ethyl ester of acrylic or methacrylic acid;

wherein the weight ratio of (a):(b) is from 1:0.1 to 1:2, and wherein the amount, by weight, of (a) is greater than the amount of (c), wherein the benefit agent is selected from the group consisting of perfumes, brighteners, dyes, insect repellants, silicones, waxes, lubricants, vitamins, fabric softening agents, enzymes, anti-bacterial agents, skin health agents and mixtures thereof; and
2) contacting fabrics in need of laundering with said laundry washing liquor.

It is an advantage of the laundry detergent composition to deliver an improved efficacy of the benefit agent on fabric after washing compared to a laundry detergent composition without the graft copolymer.

DETAILED DESCRIPTION OF THE INVENTION

Definitions

As used herein, the articles including "a" and "an" when used in a claim, are understood to mean one or more of what is claimed or described.

As used herein, the terms "comprise", "comprises", "comprising", "include", "includes", "including", "contain", "contains", and "containing" are meant to be non-limiting, i.e., other steps and other ingredients which do not affect the end of result can be added. The above terms encompass the terms "consisting of" and "consisting essentially of".

As used herein, when a composition is "substantially free" of a specific ingredient, it is meant that the composition comprises less than a trace amount, alternatively less than 0.1%, alternatively less than 0.01%, alternatively less than 0.001%, by weight of the composition, of the specific ingredient.

As used herein, the term "laundry detergent composition" means a composition for cleaning soiled materials, including fabrics. Such compositions may be used as a pre-laundering treatment, a post-laundering treatment, or may be added during the rinse or wash cycle of the laundering operation. The laundry detergent composition compositions may have a form selected from liquid, powder, unit dose such as single-compartment or multi-compartment unit dose, pouch, tablet, gel, paste, bar, or flake. Preferably, the laundry detergent composition is a liquid or a unit dose composition. The term of "liquid laundry detergent composition" herein refers to compositions that are in a form selected from the group consisting of pourable liquid, gel, cream, and combinations thereof. The liquid laundry detergent composition may be either aqueous or non-aqueous, and may be anisotropic, isotropic, or combinations thereof. The term of "unit dose laundry detergent composition" herein refers to a water-soluble pouch containing a certain volume of liquid wrapped with a water-soluble film.

As used herein, the term "Through-The-Wash dosage" or "TTW dosage" regarding the graft copolymer is defined as the parts-per-million (ppm) concentration of the graft copolymer in the laundry washing liquor formed by dissolving a recommended dosage of a laundry detergent composition in a recommended volume of water or aqueous solution. For example, if a laundry detergent composition contains 0.04 wt % of the graft copolymer, and the recommended dosage of this laundry detergent composition is 50 grams per 45 liters of water, the TTW dosage of the graft copolymer is (0.04 wt %×50 grams)/(45 liters×1000 grams/liter+50 grams)×1000000 ppm/wt %=0.444 ppm.

As used herein, the term "alkyl" means a hydrocarbyl moiety which is branched or unbranched, substituted or unsubstituted. Included in the term "alkyl" is the alkyl portion of acyl groups.

As used herein, the term "washing solution" refers to the typical amount of aqueous solution used for one cycle of laundry washing, preferably from 1 L to 65 L, alternatively from 1 L to 20 L for hand washing and from 20 L to 65 L for machine washing.

As used herein, the term "soiled fabric" is used non-specifically and may refer to any type of natural or artificial fibers, including natural, artificial, and synthetic fibers, such as, but not limited to, cotton, linen, wool, polyester, nylon, silk, acrylic, and the like, as well as various blends and combinations.

Composition

The compositions of the present disclosure may be selected from the group of light duty liquid detergents compositions, heavy duty liquid detergent compositions, detergent gels commonly used for laundry, bleaching compositions, laundry additives, fabric enhancer compositions, and mixtures thereof.

The composition may be in any suitable form. The composition may be in the form of a liquid composition, a granular composition, a single-compartment pouch, a multi-compartment pouch, a sheet, a pastille or bead, a fibrous article, a tablet, a bar, flake, or a mixture thereof. The composition can be selected from a liquid, solid, or combination thereof.

The composition can be an aqueous liquid laundry detergent composition. For such aqueous liquid laundry detergent compositions, the water content can be present at a level of from 5.0% to 95%, preferably from 25% to 90%, more preferably from 50% to 85% by weight of the liquid detergent composition.

The pH range of the detergent composition is from 6.0 to 8.9, preferably from pH 7 to 8.8.

The detergent composition can also be encapsulated in a water-soluble film, to form a unit dose article. Such unit dose articles comprise a detergent composition as described herein, wherein the detergent composition comprises less than 20%, preferably less than 15%, more preferably less than 10% by weight of water, and the detergent composition is enclosed in a water-soluble or dispersible film. Such unit-dose articles can be formed using any means known in the art. Suitable unit-dose articles can comprise one compartment, wherein the compartment comprises the liquid laundry detergent composition. Alternatively, the unit-dose articles can be multi-compartment unit-dose articles, wherein at least one compartment comprises the liquid laundry detergent composition.

Graft Copolymers

The detergent composition may comprise one or more graft copolymer. The graft copolymer can be present at a level of from about 0.01% to about 0.75%, preferably from about 0.03% to about 0.65%, more preferably from about 0.05% to about 0.50%, and most preferably from about 0.10% to about 0.29%, e.g. 0.10%, 0.15%, 0.17%, 0.20%, 0.21%, 0.22%, 0.23%, 0.24%, 0.25%, 0.26%, 0.27%, 0.28%, 0.29%, 0.3%, 0.35%, 0.4%, 0.45%, 0.50%, 0.55%, 0.60%, 0.65%, 0.70%, 0.75% or any ranges therebetween, by weight of the composition.

The graft copolymer comprises: (a) polyalkylene oxide which has a number average molecular weight of from 1000 to 20,000 Daltons and is based on ethylene oxide, propylene oxide, butylene oxide or mixture thereof, (b) N-vinylpyrrolidone, and (c) vinyl ester derived from a saturated monocarboxylic acid containing from 1 to 6 carbon atoms, wherein the weight ratio of (a):(b) is from 1:0.1 to 1:2, preferably from 1:0.1 to 1:1, more preferably from 1:0.3 to 1:1, and wherein the amount, by weight, of (a) is greater than the amount of (c).

The weight ratio of (a):(c) is from 1.0:0.1 to 1.0:0.99, or from 1.0:0.3 to 1.0:0.9. The weight ratio of (b):(c) can be from 1.0:0.1 to 1.0:5.0, or to 1.0:4.0.

The amount, by weight of the polymer, of (a) is greater than the amount of (c). The polymer may comprise at least 50% by weight, preferably at least 60% by weight, more preferably at least 75% by weight of (a) polyalkylene oxide.

The graft copolymer comprises and/or is obtainable by grafting (a) a polyalkylene oxide which has a number average molecular weight of from 1000 to 20000 Da, or to 15000, or to 12000 Da, or to 10000 Da and is based on ethylene oxide, propylene oxide, or butylene oxide, preferably based on ethylene oxide, with (b) N-vinylpyrrolidone, and further with (c) a vinyl ester derived from a saturated monocarboxylic acid containing from 1 to 6 carbon atoms, preferably a vinyl ester that is vinyl acetate or a derivative thereof.

Suitable polyalkylene oxides may be based on homopolymers or copolymers, with homopolymers being preferred. Suitable polyalkylene oxides may be based on homopolymers of ethylene oxide or ethylene oxide copolymers having an ethylene oxide content of from 40 mol % to 99 mol %. Suitable comonomers for such copolymers may include propylene oxide, n-butylene oxide, and/or isobutylene oxide. Suitable copolymers may include copolymers of ethylene oxide and propylene oxide, copolymers of ethylene oxide and butylene oxide, and/or copolymers of ethylene oxide, propylene oxide, and at least one butylene oxide. The copolymers may include an ethylene oxide content of from 40 to 99 mol %, a propylene oxide content of from 1.0 to 60 mol %, and a butylene oxide content of from 0 to 30 mol %. The graft base may be linear (straight-chain) or branched, for example a branched homopolymer and/or a branched copolymer.

Branched copolymers may be prepared by addition of ethylene oxide with or without propylene oxides and/or butylene oxides onto polyhydric low molecular weight alcohols, for example trimethylol propane, pentoses, or hexoses.

The alkylene oxide unit may be randomly distributed in the polymer or be present therein as blocks.

The polyalkylene oxides of component (a) may be the corresponding polyalkylene glycols in free form, that is, with OH end groups, or they may be capped at one or both end groups. Suitable end groups may be, for example, C1-C25-alkyl, phenyl, and C1-C14-alkylphenyl groups. The end group may be a C1-alkyl (e.g., methyl) group. Suitable materials for the graft base may include PEG 300, PEG 1000, PEG 2000, PEG 4000, PEG 6000, PEG 8000, PEG 10000, PEG 12000, and/or PEG 20000, which are polyethylene glycols, and/or MPEG 2000, MPEG 4000, MPEG 6000, MPEG 8000 and MEG 10000 which are monomethoxypolyethylene glycols that are commercially available from BASF under the tradename PLURIOL and/or block copolymers made from ethylene oxide-propylene oxide-ethylene oxide (EO-PO-EO) or from propylene oxide-ethylene oxide-propylene oxide (PO-EO-PO) such as PE 6100, PE 6800 or PE 3100 commercially available from BASF under the tradename PLURONIC.

The graft copolymers of the present disclosure may be characterized by relatively low degree of branching (i.e., degree of grafting). In the graft copolymers of the present disclosure, the average number of grafting sites may be less than or equal to 1.0, or less than or equal to 0.8, or less than or equal to 0.6, or less than or equal to 0.5, or less than or equal to 0.4, per 50 alkylene oxide groups, e.g., ethylene oxide groups. The graft copolymers may comprise, on average, based on the reaction mixture obtained, at least 0.05, or at least 0.1, graft site per 50 alkylene oxide groups, e.g., ethylene oxide groups. The degree of branching may be determined, for example, by means of $^{13}C$ NMR spectroscopy from the integrals of the signals of the graft sites and the —$CH_2$-groups of the polyalkylene oxide.

The number of grafting sites may be adjusted by manipulating the temperature and/or the feed rate of the monomers. For example, the polymerization may be carried out in such a way that an excess of component (a) and the formed graft copolymer is constantly present in the reactor. For example, the quantitative molar ratio of component (a) and polymer to ungrafted monomer (and initiator, if any) is generally greater than or equal to 10:1, or to 15:1, or to 20:1.

The polyalkylene oxides are grafted with N-vinylpyrrolidone as the monomer of component (b). Without wishing to be bound by theory, it is believed that the presence of the N-vinylpyrrolidone ("VP") monomer in the graft copolymers according to the present disclosure provides water-solubility and good film-forming properties compared to otherwise-similar polymers that do not contain the N-vinylpyrrolidone monomer. The vinyl pyrrolidone repeat unit has amphiphilic character with a polar amide group that can form a dipole, and a non-polar portion with the methylene groups in the backbone and the ring, making it hydrophobic.

The polyalkylene oxides are grafted with a vinyl ester as the monomer of component (c). The vinyl ester may be derived from a saturated monocarboxylic acid, which may contain 1 to 6 carbon atoms, or from 1 to 3 carbon atoms, or from 1 to 2 carbon atoms, or 1 carbon atom. Suitable vinyl esters may be selected from the group consisting of vinyl formate, vinyl acetate, vinyl propionate, vinyl butyrate, vinyl valerate, vinyl iso-valerate, vinyl caproate, or mixtures thereof. Preferred monomers of component (c) include those selected from the group consisting of vinyl acetate, vinyl propionate, or mixtures thereof, preferably vinyl acetate.

Conventionally, molecular weights are expressed by their "K-values," which are derived from relative viscosity measurements. The graft copolymers may have a K value of from 5.0 to 200, optionally from 5.0 to 50, determined according to H. Fikentscher in 2% strength by weight solution in dimethylformamide at 25 C.

The graft copolymers of the present disclosure may be characterized by a relatively narrow molar mass distribution. For example, the graft copolymers may be characterized by a polydispersity $M_w/M_n$ of less than or equal to 3.0, or less than or equal to 2.5, or less than or equal to 2.3. The polydispersity of the graft copolymers may be from 1.5 to 2.2. The polydispersity may be determined by gel permeation chromatography using organic solvent such as hexafluoroisopropanol (HFIP) with multi-angle laser light scattering detection.

The mean molecular weight Mw of the preferred graft polymers may be from 3000 to 100,000 Da, preferably from 6000 to 45,000 Da, and more preferably from 8000 to 30,000 Da.

The graft copolymers may be prepared by grafting the suitable polyalkylene oxides of component (a) with the monomers of component (b) in the presence of free radical initiators and/or by the action of high-energy radiation, which may include the action of high-energy electrons. This may be done, for example, by dissolving the polyalkylene oxide in at least one monomer of group (b), adding a polymerization initiator and polymerizing the mixture to completion. The graft polymerization may also be carried out semicontinuously by first introducing a portion, for example 10%, of the mixture of polyalkylene oxide to be polymerized, at least one monomer of group (b) and/or (c) and initiator, heating to polymerization temperature and, after the polymerization has started, adding the remainder of the mixture to be polymerized at a rate commensurate with the rate of polymerization. The graft copolymers may also be obtained by introducing the polyalkylene oxides of group (a) into a reactor, heating to the polymerization temperature, and adding at least one monomer of group (b) and/or (c) and polymerization initiator, either all at once, a little at a time, or uninterruptedly, optionally uninterruptedly, and polymerizing.

In the preparation of the graft copolymers, the order in which the monomers (b) and (c) are grafted onto component (a) may be immaterial and/or freely chooseable. For example, first N-vinylpyrrolidone may be grafted onto component (a), and then a monomer (c) or a mixture of monomers of group (c). It is also possible to first graft the monomers of group (c) and then N-vinylpyrrolidone onto the graft base (a). It may be that a monomer mixture of (b) and (c) are grafted onto graft base (a) in one step. The graft copolymer may be prepared by providing graft base (a) and then first grafting N-vinylpyrrolidone and then vinyl acetate onto the graft base.

Any suitable polymerization initiator(s) may be used, which may include organic peroxides such as diacetyl peroxide, dibenzoyl peroxide, succinyl peroxide, di-tert-butyl peroxide, tert-butyl perbenzoate, tert-butyl perpivalate, tert-butyl permaleate, cumene hydroperoxide, diisopropyl peroxodicarbamate, bis(o-toluoyl) peroxide, didecanoyl peroxide, dioctanoyl peroxide, dilauroyl peroxide, tert-butyl perisobutyrate, tert-butyl peracetate, di-tert-amyl peroxide, tert-butyl peracetate, di-tert-amyl peroxide, tert-butyl hydroperoxide, mixtures thereof, redox initiators, and/or azo starters. The choice of initiator may be related to the choice of polymerization temperature.

The graft polymerization may take place at from 50° C. to 200° C., or from 70° C. to 140° C. The graft polymerization may typically be carried out under atmospheric pressure, but may also be carried out under reduced or superatmospheric pressure.

The graft polymerization may be carried out in a solvent. Suitable solvents may include: monohydric alcohols, such as ethanol, propanols, and/or butanols; polyhydric alcohols, such as ethylene glycol and/or propylene glycol; alkylene glycol ethers, such as ethylene glycol monomethyl and -ethyl ether and/or propylene glycol monomethyl and -ethyl ether; polyalkylene glycols, such as di- or tri-ethylene glycol and/or di- or tri-propylene glycol; polyalkylene glycol monoethers, such as poly(C2-C3-alkylene)glycol mono (C1-C16-alkyl)ethers having 3-20 alkylene glycol units; carboxylic esters, such as ethyl acetate and ethyl propionate; aliphatic ketones, such as acetone and/or cyclohexanone; cyclic ethers, such as tetrahydrofuran and/or dioxane; or mixtures thereof.

The graft polymerization may also be carried out in water as solvent. In such cases, the first step may be to introduce a solution which, depending on the amount of added monomers of component (b), is more or less soluble in water. To transfer water-insoluble products that can form during the polymerization into solution, it is possible, for example, to add organic solvents, for example monohydric alcohols having 1 to 3 carbon atoms, acetone, and/or dimethylformamide. In a graft polymerization process in water, it is also possible to transfer the water-insoluble graft copolymers into a finely divided dispersion by adding customary emulsifiers or protective colloids, for example polyvinyl alcohol. The emulsifiers used may be ionic or nonionic surfactants whose HLB value is from 3.0 to 13. HLB value is determined according to the method described in the paper by W. C. Griffin in J. Soc. Cosmet. Chem. 5 (1954), 249.

The amount of surfactant used in the graft polymerization process may be from 0.1 to 5.0% by weight of the graft copolymer. If water is used as the solvent, solutions or dispersions of graft copolymers may be obtained. If solutions of graft copolymers are prepared in an organic solvent or in mixtures of an organic solvent and water, the amount of organic solvent or solvent mixture used per 100 parts by weight of the graft copolymer may be from 5 to 200, optionally from 10 to 100, parts by weight.

After the graft polymerization, the graft copolymer may optionally be subjected to a partial hydrolysis. In the graft copolymer, from 1.0 mol % to 60 mol %, preferably from 20 mol % to 60 mol %, more preferably from 30 mol % to 50 mol % of the grafted-on monomers of component (c) are hydrolyzed. For instance, the hydrolysis of graft copolymers prepared using vinyl acetate or vinyl propionate as component (c) gives graft copolymers containing vinyl alcohol units. The hydrolysis may be carried out, for example, by adding a base, such as sodium hydroxide solution or potassium hydroxide solution, or alternatively by adding acids and if necessary, heating the mixture.

Benefit Agent

The detergent composition may comprise one or more benefit agent elected from the group consisting of perfumes, insect repellants, silicones, waxes, lubricants, vitamins, fabric softening agents, anti-bacterial agents, skin-health agents and mixtures thereof. The benefit agent can be present at a level of from about 0.001% to about 10%, preferably from about 0.005% to about 8%, more preferably from about 0.01% to about 5%, and most preferably from about 0.1% to about 2%, e.g. 0.1%, 0.15%, 0.2%, 0.25%, 0.3%, 0.35%, 0.4%, 0.45%, 0.5%, 0.6%, 0.7%, 0.8%, 0.9%, 1%, 1.5%, or any ranges therebetween, by weight of the composition.

Particularly, the benefit agent may be substances which are intended to be deposited onto fabrics after washing. More particularly, the benefit agent may be hydrophobic. Preferably, the benefit agent may be perfume. preferably perfume having a C log P of from about −2.0 and to about 8.0, more preferably perfume having a C log P of from about 1.0 and to about 6.0; more preferably perfume having a C log P of from about 1.0 and to about 4.0, for example 1.0, 2.0, 3.0, 4.0, 5.0, 6.0 or any ranges thereof.

Perfume in the present application may be present in a form of neat perfume (e.g. perfume oil), perfume encapsulates (e.g. perfume microcapsule), a non-encapsulated fragrance delivery systems (e.g. properfumes) or any mixtures thereof.

In some embodiments, the perfume is selected from the group consisting of geraniol; menthol; (E,Z)-2,6-nonadien-1-ol; 3,6-nonadien-1-ol; 2,2-dimethyl-3-(3-methylphenyl) propan-1-ol; 2-methyl-3-[(1,7,7-trimethylbicyclo[2.2.1] hept-2-yl)oxy]propan-1-ol; 2-methyl-4-[(1R)-2,2,3-trimethyl-3-cyclopenten-1-yl]-(2E)-buten-1-ol; ethyl trimethylcyclopentene butenol; 1-(4-propan-2-ylcyclohexyl)ethanol; 1-(2,2,6-trimethylcyclohexyl)hexan-3-ol; (Z)-3-methyl-5-(2,2,3-trimethyl-1-cyclopent-3-enyl)pent-4-en-2-ol; undecavertol; methyl dihydrojasmonate; (E,Z)-2,6-nonadien-1-al; cashmeran; iso cyclo citral; triplal; neobutenone alpha; delta damascone; alpha-pinyl isobutyraldehyde; vanillin; lilial; intreleven aldehyde; hexyl cinnamic aldehyde; adoxal; dupical; lyral; 2-tridecenal; methyl-nonyl-acetaldehyde; 4-tert-butylbenzaldehyde; dihydrocitronellal; citral; citronellal; isocyclocitral; 2,4,6-trimethoxybenzaldehyde; cuminic aldehyde; 2-methyloctanal; para tolyl acetaldehyde; o-anisaldehyde; anisic aldehyde; hexyl aldehyde; 2-methylpenanal; benzaldehyde; trans-2-hexenal; nonyl aldehyde; lauric aldehyde; beta ionone; koavone; tabanone coeur; zingerone; L-carvone; ionone gamma methyl; nectaryl; trimofix; farnesol; (E)-2-ethyl-4-(2,2,3-trimethyl-1-cyclopent-3-enyl)but-2-en-1-ol; 2-Methyl-4-[(1R)-2,2,3-trimethyl-3-cyclopenten-1-yl]-(2E)-buten-1-ol; nerol (800); ethyl vanillin; 4-(5,5,6-Trimethylbicyclo[2.2.1]hept-2-yl)cyclohexan-1-ol; octalynol 967544; (E)-3,3-dimethyl-5-(2,2,3-trimethyl-3-cyclopenten-1-yl)-4-penten-2-ol; 3-methyl-4-phenylbutan-2-ol; eugenol; 1-(2,2,6-trimethylcyclohexyl)hexan-3-ol; propenyl guaethol; 2-ethoxy-4-methylphenol; cyclopentol HC 937165; 3,7,11-Trimethyl-1,6,10-dodecatrien-3-ol; cedrol crude; 3,7-dimethyl-1,6-nonadien-3-ol (cis & trans); 1-methyl-3-(2-methylpropyl)cyclohexanol; 3,7-dimethyl-1,6-octadiene-3-ol; 2-(4-methyl-1-cyclohex-3-enyl)propan-2-ol; cyclohexanepropanol,2,2-dimethyl-, 3,7-dimethyl-1-octen-7-ol; Methyl ionone; isojasmone B 11; alpha-damascone; beta-damascone; fleuramone; 3-ethoxy-4-hydroxybenzaldehyde; formyltricyclodecan; 6-methoxy dicyclopentadiene carboxaldehyde; undecylenic aldehyde; 4-hydroxy-3-methoxybenzaldehyde; 8-,9 and 10-undecenal, mixture of isomers; trans-4-decenal; 4-dodecenal; 4-(octahydro-4,7-methano-5H-inden-5-yliden)butanal; 3-cyclohexene-1-propanal; beta,4-dimethyl-, mandarine aldehyde 10% CITR 965765; 4,8-dimethyl-4,9-decadienal; 1-methylethyl-2-methylbutanoate; ethyl-2-methyl pentanoate; 1,5-dimethyl-1-ethenylhexyl-4-enyl acetate; p-menth-1-en-8-yl acetate; 4-(2,6,6-trimethyl-2-cyclohexenyl)-3-buten-2-one; 4-acetoxy-3-methoxy-1-propenylbenzene; 2-propenyl cyclohexanepropionate; bicyclo[2.2.1]hept-5-ene-2-carboxylic acid, 3-(1-methylethyl)-ethyl ester; bycyclo [2.2.1]heptan-2-ol, 1,7,7-trimethyl-, acetate; 1,5-dimethyl-1-ethenylhex-4-enylacetate; hexyl 2-methyl propanoate; ethyl-2-methylbutanoate; 4-undecanone; 5-heptyldihydro-2(3 h)-furanone; 1,6-nonadien-3-ol,3,7dimethyl-; 3,7-dimethylocta-1,6-dien-3-o; 3-cyclohexene-1-carboxaldehyde, dimethyl-; 3,7-dimethyl-6-octene nitrile; 4-(2,6,6-trimethyl-1-cyclohexenyl)-3-buten-2-one; tridec-2-enonitrile; patchouli oil; ethyl tricycle [5.2.1.0]decan-2-carboxylate; 2,2-dimethyl-cyclohexanepropanol; hexyl ethanoate, 7-acetyl,1,2,3,4,5,6,7,8-octahydro-1,1,6,7-tetramethyl naphtalene; allyl-cyclohexyloxy acetate; methyl nonyl acetic aldehyde; 1-spiro[4,5]dec-7-en-7-yl-4-pentenen-1-one; 7-octen-2-ol, 2-methyl-6-methylene-,dihydro; cyclohexanol,2-(1,1-dimethylethyl)-, acetate; hexahydro-4,7-methanoinden-5(6)-yl propionatehexahydro-4,7-methanoinden-5(6)-yl propionate; 2-methoxynaphtalene; 1-(2,6,6-trimethyl-3-cyclohexenyl)-2-buten-1-one; 1-(2,6,6-trimethyl-2-cyclohexenyl)-2-buten-1-one; 3,7-dimethyloctan-3-ol; 3-buten-2-one,3-methyl-4-(2,6,6-trimethyl-1-cyclohexen-2-yl)-; hexanoic acid, 2-propenyl ester; (z)-non-6-en-1-al; 1-decyl aldehyde; 1-octanal; 4-t-butyl-α-methylhydrocinnamaldehyde; alpha-hexylcinnamaldehyde; ethyl-2,4-hexadienoate; 2-propenyl 3-cyclohexanepropanoate; (5-methyl-2-propan-2-ylcyclohexyl)acetate; 3,7-dimethyloct-6-en-1-al; 2-(phenoxy)ethyl 2-methylpropanoate; prop-2-enyl 2-(3-methylbutoxy)acetate; 3-methyl-1-isobutylbutyl acetate; prop-2-enyl hexanoate; prop-2-enyl 3-cyclohexylpropanoate; prop-2-enyl heptanoate; (E)-1-(2,6,6-trimethyl-1-cyclohex-2-enyl) but-2-en-1-one; (E)-4-(2,6,6-trimethyl-1-cyclohex-2-enyl) but-3-en-2-one; (E)-3-methyl-4-(2,6,6-trimethyl-1-cyclohex-2-enyl)but-3-en-2-one; 1-(2,6,6-trimethyl-1-cyclohex-2-enyl)pent-1-en-3-one; 6,6,9a-trimethyl-1,2,3a,4,5,5a,7,8,9,9b-decahydronaphtho[2,1-b]furan; pentyl 2-hydroxybenzoate; 7,7-dimethyl-2-methylidene-norbornane; (E)-1-(2,6,6-trimethyl-1-cyclohexenyl)but-2-en-1-one; (E)-4-(2,6,6-trimethyl-1-cyclohexenyl)but-3-en-2-one; 4-ethoxy-4,8,8-trimethyl-9-methylidenebicyclo[3.3.1] nonane; (1,7,7-trimethyl-6-bicyclo[2.2.1]heptanyl)acetate; 3-(4-tert-butylphenyl)propanal; 1,1,2,3,3-pentamethyl-2,5,6,7-tetrahydroinden-4-one; 2-oxabicyclo2.2.2octane, 1methyl4(2,2,3trimethylcyclopentyl); [(Z)-hex-3-enyl]acetate; [(Z)-hex-3-enyl]2-methylbutanoate; cis-3-hexenyl 2-hydroxybenzoate; 3,7-dimethylocta-2,6-dienal; 3,7-dimethyloct-6-en-1-al; 3,7-dimethyl-6-octen-1-ol; 3,7-dimethyloct-6-enyl acetate; 3,7-dimethyloct-6-enenitrile; 2-(3,7-dimethyloct-6-enoxy)acetaldehyde; tetrahydro-4-methyl-2-propyl-2 h-pyran-4-yl acetate; ethyl 3-phenyloxirane-2-carboxylate; hexahydro-4,7-methano-indenyl isobutyrate; 2,4-dimethylcyclohex-3-ene-1-carbaldehyde; hexahydro-4,7-methano-indenyl propionate; 2-cyclohexylethyl acetate; 2-pentylcyclopentan-1-ol; (2R,3R,4S,5S,6R)-2-[(2R,3S,4R,5R,6R)-6-(6-cyclohexylhexoxy)-4,5-dihydroxy-2-(hydroxymethyl)oxan-3-yl]oxy-6-(hydroxymethyl)oxane-3,4,5-triol; (E)-1-(2,6,6-trimethyl-1-cyclohexa-1,3-dienyl)but-2-en-1-one; 1-cyclohexylethyl (E)-but-2-enoate; dodecanal; (E)-1-(2,6,6-trimethyl-1-cyclohex-3-enyl)but-2-en-1-one; (5E)-3-methylcyclopentadec-5-en-1-one; 4-(2,6,6-trimethyl-1-cyclohex-2-enyl)butan-2-one; 2-methoxy-4-propylphenol; methyl 2-hexyl-3-oxocyclopentane-1-carboxylate; 2,6-dimethyloct-7-en-2-ol; 4,7-dimethyloct-6-en-3-one; 4-(octahydro-4,7-methano-5H-inden-5-yliden)butanal; acetaldehyde ethyl linalyl acetal; ethyl 3,7-dimethyl-2,6-octadienoate; ethyl 2,6,6-trimethylcyclohexa-1,3-diene-1-carboxylate; 2-ethylhexanoate; (6E)-3,7-dimethylnona-1,6-dien-3-ol; ethyl 2-methylbutanoate; ethyl 2-methylpentanoate; ethyl tetradecanoate; ethyl nonanoate; ethyl 3-phenyloxirane-2-carboxylate; 1,4-dioxacycloheptadecane-5,17-dione; 1,3,3-trimethyl-2-oxabicyclo[2,2,2]octane; [essential oil]; oxacyclo-hexadecan-2-one; 3-(4-ethylphenyl)-2,2-dimethylpropanal; 2-butan-2-ylcyclohexan-1-one; 1,4-cyclohexandicarboxylic acid, diethyl ester; (3aalpha,4beta,7beta,7aalpha)-octahydro-4,7-methano-3aH-indene-3a-carboxylic acid ethyl ester; hexahydro-4-7, menthano-1H-inden-6-yl propionate; 2-butenon-1-one,1-(2,6-dimethyl-6-methylencyclohexyl)-; (E)-4-(2,2-dimethyl-6-methylidenecyclohexyl)but-3-en-2-one; 1-methyl-4-propan-2-ylcyclohexa-1,4-diene; 5-heptyloxolan-2-one; 3,7-dimethylocta-2,6-dien-1-ol; [(2E)-3,7-dimethylocta-2,6-dienyl]acetate; [(2E)-3,7-dimethylocta-2,6-dienyl]octanoate; ethyl 2-ethyl-6,6-dimethylcyclohex-2-ene-1-carboxylate; (4-methyl-1-propan-2-yl-1-cyclohex-2-enyl)acetate; 2-butyl-4,6-dimethyl-5,6-dihydro-2H-pyran; oxacyclohexadecen-2-one; 1-propanol,2-[1-(3,3-dimethyl-cyclohexyl) ethoxy]-2-methyl-propanoate; 1-heptyl acetate; 1-hexyl acetate; hexyl 2-methylpropanoate; (2-(1-ethoxyethoxy) ethyl)benzene; 4,4a,5,9b-tetrahydroindeno[1,2-d][1,3]dioxine; undec-10-enal; 3-methyl-4-(2,6,6-trimethyl-2-cyclohexen-1-yl)-3-buten-2-one; 1-(1,2,3,4,5,6,7,8-octahydro-2,3,8,8-tetramethyl-2-naphthalenyl)-ethan-1-one; 7-acetyl,1,2,3,4,5,6,7-octahydro-1,1,6,7,-tetra methyl naphthalene; 3-methylbutyl 2-hydroxybenzoate; [(1R,4S,6R)-1,7,7-trimethyl-6-bicyclo[2.2.1]heptanyl]acetate; [(1R,4R,6R)-1,7,7-trimethyl-6-bicyclo[2.2.1]heptanyl]2-methylpropanoate; (1,7,7-trimethyl-5-bicyclo[2.2.1]heptanyl)propanoate; 2-methylpropyl hexanoate; [2-methoxy-4-[(E)-prop-1-enyl] phenyl]acetate; 2-hexylcyclopent-2-en-1-one; 5-methyl-2-propan-2-ylcyclohexan-1-one; 7-methyloctyl acetate; propan-2-yl 2-methylbutanoate; 3,4,5,6,6-pentamethylheptenone-2; hexahydro-3,6-dimethyl-2(3H)-benzofuranone; 2,4,4,7-tetramethyl-6,8-nonadiene-3-one oxime; dodecyl acetate; [essential oil]; 3,7-dimethylnona-2,6-dienenitrile; [(Z)-hex-3-enyl]methyl carbonate; 2-methyl-3-(4-tert-butylphenyl)propanal; 3,7-dimethylocta-1,6-dien-3-ol; 3,7-dimethylocta-1,6-dien-3-yl acetate; 3,7-dimethylocta-1,6-dien-3-yl butanoate; 3,7-dimethylocta-1,6-dien-3-yl formate; 3,7-dimethylocta-1,6-dien-3-yl 2-methylpropanoate; 3,7-dimethylocta-1,6-dien-3-yl propanoate; 3-methyl-7-propan-2-ylbicyclo[2.2.2]oct-2-ene-5-carbaldehyde; 2,2-dimethyl-3-(3-methylphenyl)propan-1-ol; 3-(4-tert-butylphenyl)butanal; 2,6-dimethylhept-5-enal; 5-methyl-2-propan-2-yl-cyclohexan-1-ol; 1-(2,6,6-trimethyl-1-cyclohexenyl)pent-1-en-3-one; methyl 3-oxo-2-pentylcyclopentaneacetate; methyl tetradecanoate; 2-methylundecanal; 2-methyldecanal; 1,1-dimethoxy-2,2,5-trimethyl-4-hexene; [(1S)-3-(4-methylpent-3-enyl)-1-cyclohex-3-enyl]methyl acetate; 2-(2-(4-methyl-3-cyclohexen-1-yl) propyl)cyclo-pentanone; 4-penten-1-one, 1-(5,5-dimethyl-1-cyclohexen-1-yl; 1H-indene-ar-propanal,2,3,-dihydro-1,1-dimethyl-(9CI); 2-ethoxynaphthalene; nonanal; 2-(7,7-dimethyl-4-bicyclo[3.1.1]hept-3-enyl)ethyl acetate; octanal; 4-(1-methoxy-1-methylethyl)-1-methylcyclohexene; (2-tert-butylcyclohexyl) acetate; (E)-1-ethoxy-4-(2-methylbutan-2-yl)cyclohexane; 1,1-dimethoxynon-2-yne; [essential oil]; 2-cyclohexylidene-2-phenylacetonitrile; 2-cyclohexyl-1,6-heptadien-3-one; 4-cyclohexyl-2-methylbutan-2-ol; 2-phenylethyl 2-phenylacetate; (2E, 5E/Z)-5,6,7-trimethyl octa-2,5-dien-4-one; 1-methyl-3-(4-methylpent-3-enyl)cyclohex-3-ene-1-carbaldehyde; methyl 2,2-dimethyl-6-methylidenecyclohexane-1-carboxylate; 1-(3,3-dimethylcyclohexyl)ethyl acetate; 4-methyl-2-(2-methylprop-1-enyl)oxane; 1-spiro(4.5)-7-decen-7-yl-4-penten-1-one; 4-(2-butenylidene)-3,5,5-trimethylcyclohex-2-en-1-one; 2-(4-methyl-1-cyclohex-3-enyl)propan-2-ol; 4-isopropylidene-1-methyl-cyclohexene; 2-(4-methyl-1-cyclohex-3-enyl)propan-2-yl acetate; 3,7-dimethyloctan-3-ol; 3,7-dimethyloctan-3-ol; 3,7-dimethyloctan-3-yl acetate; 3-phenylbutanal; (2,5-dimethyl-4-oxofuran-3-yl)acetate; 4-methyl-3-decen-5-ol; undec-10-enal; (4-formyl-2-methoxyphenyl) 2-methylpropanoate; 2,2,5-trimethyl-5-pentylcyclopentan-1-one; 2-tert-butylcyclohexan-1-ol; (2-tert-butylcyclohexyl)acetate; 4-tert-butylcyclohexyl acetate; 1-(3-methyl-7-propan-2-yl-6-bicyclo[2.2.2]oct-3-enyl)ethanone; (4,8-dimethyl-2-propan-2-ylidene-3,3a,4,5,6,8a-hexahydro-1H-azulen-6-yl)acetate; [(4Z)-1-cyclooct-4-enyl]methyl carbonate; beta naphthol methyl ether; 1-methyl-4-(4-4-methylpentyl)cyclohex-3-ene-1-carbaldehyde-3,7-dimethylocta-1,6-dien-3-ol and any mixtures thereof.

Dye Transfer Inhibitors

The detergent composition may further comprise one or more dye transfer inhibitors (DTI) polymers. The DTI polymer can be present at the level of from about 0.001% to about 1%, preferably from about 0.005% to about 0.5%, more preferably from about 0.008% to about 0.2%, and most preferably from about 0.01% to about 0.1%, e.g. 0.01%, 0.015%, 0.02%, 0.025%, 0.03%, 0.035%, 0.04%, 0.05%, 0.06%, 0.07%, 0.08%, 0.1% or any ranges therebetween, by weight of the composition, of the DTI polymer Suitable dye transfer inhibitors are selected from the group consisting of: polyvinylpyrrolidone polymers, polyamine N-oxide polymers, copolymers of N-vinylpyrrolidone and N-vinylimidazole, polyvinyloxazolidones, polyvinylimidazoles and mixtures thereof. Other suitable DTIs are triazines as described in WO2012/095354, polymerized benzoxazines as described in WO2010/130624, polyvinyl tetrazoles as described in DE 102009001144A, porous polyamide particles as described in WO2009/127587 and insoluble polymer particles as described in WO2009/124908. Other suitable DTIs are described in WO2012/004134, or polymers selected from the group consisting of (a) amphiphilic alkoxylated polyamines, amphiphilic graft copolymers, zwitterionic soil suspension polymers, manganese phthalocyanines, peroxidases and mixtures thereof.

Preferred classes of DTI include but are not limited to polyvinylpyrrolidone polymers, polyamine N-oxide polymers, copolymers of N-vinylpyrrolidone and N-vinylimidazole, polyvinyloxazolidones, polyvinylimidazoles and mixtures thereof. More specifically, the polyamine N-oxide polymers preferred for use herein contain units having the following structural formula: R-AX-P; wherein P is a polymerizable unit to which an N—O group can be attached or the N—O group can form part of the polymerizable unit or the N—O group can be attached to both units; A is one of the following structures: —NC(O)—, —C(O)O—, —S—, —O—, —N=; x is 0 or 1; and R is aliphatic, ethoxylated aliphatics, aromatics, heterocyclic or alicyclic groups or any combination thereof to which the nitrogen of the N—O group can be attached or the N—O group is part of these groups. Preferred polyamine N-oxides are those wherein R is a heterocyclic group such as pyridine, pyrrole, imidazole, pyrrolidine, piperidine and derivatives thereof.

The N—O group can be represented by the following general structures:

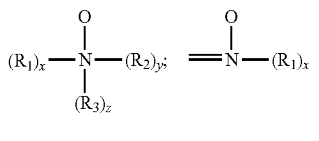

wherein R1, R2, R3 are aliphatic, aromatic, heterocyclic or alicyclic groups or combinations thereof; x, y and z are 0 or 1; and the nitrogen of the N—O group can be attached or form part of any of the aforementioned groups. The amine oxide unit of the polyamine N-oxides has a pKa<10, preferably pKa<7, more preferred pKa<6.

Any polymer backbone can be used as long as the amine oxide polymer formed is water-soluble and has dye transfer inhibiting properties. Examples of suitable polymeric backbones are polyvinyls, polyalkylenes, polyesters, polyethers, polyamide, polyimides, polyacrylates and mixtures thereof. These polymers include random or block copolymers where one monomer type is an amine N-oxide and the other monomer type is an N-oxide. The amine N-oxide polymers typically have a ratio of amine to the amine N-oxide of 10:1 to 1:1,000,000. However, the number of amine oxide groups present in the polyamine oxide polymer can be varied by appropriate copolymerization or by an appropriate degree of N-oxidation. The polyamine oxides can be obtained in almost any degree of polymerization.

Typically, the average molecular weight is within the range of 500 to 1,000,000; more preferred 1,000 to 500,000; most preferred 5,000 to 100,000. This preferred class of materials can be referred to as "PVNO". The most preferred polyamine N-oxide useful in the detergent compositions herein is poly(4-vinylpyridine-N-oxide) which as an average molecular weight of about 50,000 and an amine to amine N-oxide ratio of about 1:4.

Copolymers of N-vinylpyrrolidone and N-vinylimidazole polymers (referred to as a class as "PVPVI") are also preferred for use herein. Preferably the PVPVI has an average molecular weight range from 5,000 to 1,000,000, more preferably from 5,000 to 200,000, and most preferably from 10,000 to 20,000. (The average molecular weight range is determined by light scattering as described in Barth, et al., Chemical Analysis, Vol 113. "Modem Methods of Polymer Characterization"). The PVPVI copolymers typically have a molar ratio of N-vinylimidazole to N-vinylpyrrolidone from 1:1 to 0.2:1, more preferably from 0.8:1 to 0.3:1, most preferably from 0.6:1 to 0.4:1.

These copolymers can be either linear or branched.

The present compositions also may employ a polyvinylpyrrolidone ("PVP") having an average molecular weight of from about 5,000 to about 400,000, preferably from about 5,000 to about 200,000, and more preferably from about 5,000 to about 50,000. PVP's are known to persons skilled in the detergent field; see, for example, EP-A-262,897 and EP-A-256,696, incorporated herein by reference. Compositions containing PVP can also contain polyethylene glycol ("PEG") having an average molecular weight from about 500 to about 100,000, preferably from about 1,000 to about 10,000. Preferably, the ratio of PEG to PVP on a ppm basis delivered in wash solutions is from about 2:1 to about 50:1, and more preferably from about 3:1 to about 10:1.

Suitable examples include PVP-K15, PVP-K30, ChromaBond S-400, ChromaBond S-403E and Chromabond S-100 from Ashland, and Sokalan® HP165, Sokalan® HP50, Sokalan® HP53, Sokalan® HP59, Sokalan® HP 56K, Sokalan® HP 66 from BASF; Reilline 4140 from Vertellus.

Surfactant System

Preferably, the composition may comprise from 4% to 80%, preferably from 6% to 50%, more preferably from 10% to 30%, e.g., 5%, 10%, 15%, 20%, 25%, 30%, 35%, 40%, 45%, 50% or any ranges therebetween, by weight of the composition, of a surfactant system. Particularly, the surfactant system may comprise an anionic surfactant and a nonionic surfactant.

The anionic surfactant suitable for the composition may be selected from the group consisting of $C_6$-$C_{20}$ linear alkylbenzene sulfonates (LAS), $C_6$-$C_{20}$ alkyl sulfates (AS), $C_6$-$C_{20}$ alkyl alkoxy sulfates (AAS), $C_6$-$C_{20}$ methyl ester sulfonates (MES), $C_6$-$C_{20}$ alkyl ether carboxylates (AEC), and any combinations thereof. For example, the laundry detergent composition may contain a $C_6$-$C_{20}$ alkyl alkoxy sulfates ($AA_xS$), wherein x is about 1-30, preferably about 1-15, more preferably about 1-10, most preferably x is about 1-3. The alkyl chain in such $AA_xS$ can be either linear or branched, with mid-chain branched $AA_xS$ surfactants being particularly preferred. A preferred group of $AA_xS$ include $C_{12}$-$C_{14}$ alkyl alkoxy sulfates with x of about 1-3. In some embodiments, the composition comprises from 1% to 30%, preferably from 2% to 25%, more preferably from 3% to 20%, for example, 4%, 5%, 6%, 7%, 8%, 9%, 10%, 12%, 14%, 16%, 18%, 20%, or any ranges therebetween, by weight of the composition of the anionic surfactant.

The nonionic surfactant suitable for the composition may be selected from the group consisting of alkyl alkoxylated alcohols, alkyl alkoxylated phenols, alkyl polysaccharides, polyhydroxy fatty acid amides, alkoxylated fatty acid esters, sucrose esters, sorbitan esters and alkoxylated derivatives of sorbitan esters, and any combinations thereof. Non-limiting examples of nonionic surfactants suitable for use herein include: $C_{12}$-$C_{18}$ alkyl ethoxylates, such as Neodol® nonionic surfactants available from Shell; $C_6$-$C_{12}$ alkyl phenol alkoxylates wherein the alkoxylate units are a mixture of ethyleneoxy and propyleneoxy units; $C_{12}$-$C_{18}$ alcohol and $C_6$-$C_{12}$ alkyl phenol condensates with ethylene oxide/propylene oxide block alkyl polyamine ethoxylates such as Pluronic® available from BASF; $C_{14}$-$C_{22}$ mid-chain branched alkyl alkoxylates, BAEx, wherein x is from about 1 to about 30; alkylpolysaccharides, specifically alkylpolyglycosides; polyhydroxy fatty acid amides; and ether capped poly(oxyalkylated) alcohol surfactants. Also useful herein as nonionic surfactants are alkoxylated ester surfactants such as those having the formula $R^1C(O)O(R_2O)nR^3$ wherein $R^1$ is selected from linear and branched $C_6$-$C_{22}$ alkyl or alkylene moieties; $R^2$ is selected from $C_2H_4$ and $C_3H_6$ moieties and $R^3$ is selected from H, $CH_3$, $C_2H_5$ and $C_3H_7$ moieties; and n has a value between about 1 and about 20. Such alkoxylated ester surfactants include the fatty methyl ester ethoxylates (MEE) and are well-known in the art. In some particular embodiments, the alkoxylated nonionic surfactant contained by the laundry detergent composition is a $C_6$-$C_{20}$ alkoxylated alcohol, preferably $C_8$-$C_{18}$ alkoxylated alcohol, more preferably $C_{10}$-$C_{16}$ alkoxylated alcohol. The $C_6$-$C_{20}$ alkoxylated alcohol is preferably an alkyl alkoxylated alcohol with an average degree of alkoxylation of from about 1 to about 50, preferably from about 3 to about 30, more preferably from about 5 to about 20, even more preferably from about 5 to about 9. In some embodiments, the composition comprises from 1% to 30%, preferably from 2% to 25%, more preferably from 3% to 20%, for example, 4%, 5%, 6%, 7%, 8%, 9%, 10%, 12%, 14%, 16%, 18%, 20%, or any ranges therebetween, by weight of the composition of the nonionic surfactant.

The ratio of anionic surfactant to nonionic surfactant may be between 0.01 and 100, preferably between 0.05 and 20, more preferably between 0.1 and 10, and most preferably between 0.2 and 5.

In some embodiments, the anionic surfactant comprises a $C_6$-$C_{20}$ linear alkylbenzene sulfonate surfactant (LAS), preferably $C_{10}$-$C_{16}$ LAS, and more preferably $C_{12}$-$C_{14}$ LAS. In other embodiments, the anionic surfactant comprises a $C_6$-$C_{20}$ alkyl alkoxy sulfates (AAS), preferably $C_{10}$-$C_{16}$ AAS, and more preferably $C_{12}$-$C_{14}$ AAS. In other embodiments, the anionic surfactant comprises a $C_6$-$C_{20}$ alkyl sulfates (AS), preferably $C_{10}$-$C_{16}$ AS, and more preferably $C_{12}$-$C_{14}$ AS.

In some particular embodiments, the anionic surfactant may be present as the main surfactant, preferably as the majority surfactant, in the composition. Preferably, the ratio of anionic surfactant to nonionic surfactant may be between 1.05 and 100, preferably between 1.1 and 20, more preferably between 1.2 and 10, and most preferably between 1.3 and 5. Particularly, the anionic surfactant may comprise $C_6$-$C_{20}$ linear alkylbenzene sulfonates (LAS).

In some particular embodiments, the nonionic surfactant may be present as the main surfactant, preferably as the majority surfactant, in the composition. Preferably, the ratio of anionic surfactant to nonionic surfactant may be between 0.01 and 0.95, preferably between 0.05 and 0.9, more preferably between 0.1 and 0.85, and most preferably between 0.2 and 0.8. Particularly, the nonionic surfactant may comprise $C_6$-$C_{20}$ alkoxylated alcohol, preferably $C_{10}$-$C_{16}$ alkoxylated alcohol, more preferably $C_{12}$-$C_{14}$ alkoxylated alcohol.

The laundry detergent composition may further comprise a cationic surfactant. Non-limiting examples of cationic surfactants include: quaternary ammonium surfactants, which can have up to 26 carbon atoms include: alkoxylated quaternary ammonium (AQA) surfactants; dimethyl hydroxyethyl quaternary ammonium compounds; dimethyl diisopropoxy quaternary ammonium compounds; dimethyl hydroxyethyl lauryl ammonium chloride; polyamine cationic surfactants; and amino surfactants, specifically amido propyldimethyl amine (APA).

The laundry detergent composition may further comprise an amphoteric surfactant. Non-limiting examples of amphoteric surfactants include: amine oxides, derivatives of secondary and tertiary amines, derivatives of heterocyclic secondary and tertiary amines, or derivatives of quaternary ammonium, quaternary phosphonium or tertiary sulfonium compounds. Preferred examples include: $C_6$-$C_{20}$ alkyldimethyl amine oxides, betaine, including alkyl dimethyl betaine and cocodimethyl amidopropyl betaine, sulfo and hydroxy betaines, such as N-alkyl-N,N-dimethylammino-1-propane sulfonate where the alkyl group can be $C_8$-$C_{18}$ or $C_{10}$-$C_{14}$.

Other Ingredients

The laundry detergent composition according to the present disclosure may further comprise from 0.01% to 10%, preferably from 0.1% to 5%, more preferably from 0.2% to 3%, most preferably from 0.3% to 2%, by weight of the composition, of a surfactant boosting polymer, preferably polyvinyl acetate grafted polyethylene oxide copolymer.

The laundry detergent composition herein may comprise adjunct ingredients. Suitable adjunct materials include but are not limited to: builders, chelating agents, rheology modifiers, dye transfer inhibiting agents, dispersants, enzymes, and enzyme stabilizers, anti-oxidants, catalytic materials, bleach activators, hydrogen peroxide, sources of hydrogen peroxide, preformed peracids, polymeric dispersing agents, clay soil removal/anti-redeposition agents, brighteners, suds suppressors, dyes, photobleaches, perfumes, perfume microcapsules, structure elasticizing agents, fabric softeners, carriers, hydrotropes, processing aids, solvents, hueing agents, structurants and/or pigments. The precise nature of these adjunct ingredients and the levels thereof in the laundry detergent composition will depend on the physical form of the composition and the nature of the cleaning operation for which it is to be used.

In some embodiments, the laundry detergent composition according to the present disclosure may further comprise from 0.01% to 10%, preferably from 0.1% to 5%, more preferably from 0.2% to 3%, most preferably from 0.3% to 2%, by weight of the composition, of a fatty acid (e.g. $C_{12-18}$ fatty acid).

Composition Preparation

The laundry detergent composition is generally prepared by conventional methods such as those known in the art of making laundry detergent compositions. Such methods typically involve mixing the essential and optional ingredients in any desired order to a relatively uniform state, with or without heating, cooling, application of vacuum, and the like, thereby providing laundry detergent compositions containing ingredients in the requisite concentrations.

Method of Use

Another aspect of the present application is directed to a method of using the laundry detergent composition to treat a fabric. Such method can deliver a color protection benefit. The method comprises the step of administering from 5 g to 120 g of the above-mentioned laundry detergent composition into a laundry washing basin comprising water to form a washing solution. The washing solution in a laundry washing basin herein preferably has a volume from 1 L to 50 L, alternatively from 1 L to 20 L for hand washing and from 10 L to 65 L for machine washing. The temperatures of the laundry washing solution preferably range from 5° C. to 60° C.

In some embodiments, the composition is added to a washing machine via a dispenser (e.g. a dosing drawer). In some other embodiments, the composition is added to an automatic dosing washing machine via an automatic dosing mechanism. In some other embodiments, the composition is added to directly a drum of a washing machine. In some other embodiments, the composition is added directly to the wash liquor.

The dosing amount in the method herein may be different depending on the washing type. In one embodiment, the method comprises administering from about 5 g to about 60 g of the laundry detergent composition into a hand washing basin (e.g., about 2-4 L). In an alternative embodiment, the method comprises administering from about 5 g to about 100 g, preferably from about 10 g to about 65 g of the laundry detergent composition into a washing machine (e.g., about 10-45 L). In yet another embodiment, the detergent composition is dosed from an automatic dosing washing machine.

Test Method

Test 1: Perfume Headspace Test

A. Fabric Treatment in a Full Scale Programmable Machine.

Programmable machines (Electrolux W565H) have been pre-washed in a self-clean model (90° C. water, 1 hour cycle) every time before washing fabrics.

Cotton fabrics (Heavy Cotton, CW98, from Daxin Textile Co. Beijing China) were washed (20 cm×20 cm, 3 test fabrics in each washing machine) with 65 g of Samples (i.e. detergent compositions) in different machines and samples as table below:

| | Machine 1 | Machine 2 | Machine 3 | Machine 4 |
|---|---|---|---|---|
| Cycle 1 | Sample 1 | Sample 2 | Sample 3 | Sample 4 |
| Cycle 2 | Sample 2 | Sample 3 | Sample 4 | Sample 1 |
| Cycle 3 | Sample 3 | Sample 4 | Sample 1 | Sample 2 |
| Cycle 4 | Sample 4 | Sample 1 | Sample 2 | Sample 3 |

Test fabrics were washed together with 1.7 kg ballast (cotton to fabric ratio 8:2) and one half piece of soil ballast sheets (SBL2004 available from WfK Testgewebe GmbH, Bruggen, Germany) under cycling below:

| | |
|---|---|
| Inlet water temp. (Room temperature) | Setup |
| Water volume | 11 L |
| Water hardness | City water (ca. 16 gpg) |
| Washing Time | 17 min |
| Washing Temperature | 30 C. heating 2 C./min |
| Spinning | 1000 rpm 2 min10 sec |
| 1st Rinse Water volume | 11 L |
| 1st Rinse Time | 7 min |
| 1st Rinse Temperature | No heating |
| 1st Rinse Spinning | 1000 rpm 3 min10 sec |
| 2nd Rinse Water volume | 11 L |
| 2nd Rinse Time | 8 min |
| 2nd Rinse Temperature | No heating |
| 2nd Rinse Spinning | 1200 rpm 2 min50 sec |

After wash test fabrics were wrapped with Aluminum foil paper separately and store at 4° C. before submitting to headspace measurements.

B. Fabric Treatment in a Tergetometer.

Before testing for perfume headspace, the test fabrics are prepared and treated according to the procedure described below. Fabrics are typically "de-sized" and/or "stripped" of any manufacturer's finish that may be present and pre-conditioned with fabric enhancer according to A, dried, cut into fabric specimens and then treated with a detergent composition in a tergotometer.

B1. Fabric De-sizing Method. New fabrics are de-sized by washing two cycles at 49° C. (120° F.), using zero grain water in a top loading washing machine such as Kenmore 80 series. All fabrics are tumble-dried after the second cycle for 45 minutes on cotton/high setting in a Kenmore series dryer.

B2. Fabric Pre-conditioning Method. De-sized fabrics are pre-conditioned with detergent and liquid fabric softener by washing for 3 cycles at 32° C. using 6 grain per gallon water in a top loading washing machine such as Kenmore 80 series. The detergent (Tide®, 83 g) is added to the drum of the washing machine after the water has filled at the beginning of the wash cycle, followed by 2.5 kg of de-sized 100% cotton terry towels (30.5 cm×30.5 cm, RN37000-ITL available from Calderon Textiles, LLC 6131 W 80th St Indianapolis IN). Liquid fabric softener (Downy®, 46 g) is added to the drum during the rinse cycle once the rinse water has filled. All fabrics are tumble-dried after the second cycle for 45 minutes on cotton/high setting in a Kenmore series dryer. Each treated fabric is die-cut into 1.4 cm-diameter circle test specimens using a pneumatic press (Atom Clicker Press SE20C available from Manufacturing Suppliers Services, Cincinnati, OH).

B3. Fabric Treatment Method in a Tergotometer.

The tergotometer is filled to a 1 L fill volume and is programmed for a 12 min agitation time, and a 10 min rinse cycle with an agitation speed of 300 rpm using 15 gpg/30° C. water for the wash and 15 gpg/25° C. (77° F.) water for the rinse with agitation sweep angle of 15°. Water is removed by centrifugation for 2 min at 1500 rpm after the washing and rinsing steps. The Detergent Composition (1.5 g) is added to the washing pot after the water is filled to 350 g and then agitated for 60 s. The pre-conditioned fabrics (8×1.4 cm diameter circles) are added to glass sample vial (#24694, available from Restek, Bellefonte, PA), the weight is recorded (8×1.4 cm circles weigh about 0.63 g±0.07 g), and the vial is capped (#093640-094-00 available from Gerstel, Linthicum, MD). Once the detergent, and all test fabrics are added to the Tergotometer pot, the timed cycle begins. After the washing cycle is complete, the fabrics are removed, and dried for 30 min/62° C. For each perfume headspace analysis, 12 replicates are prepared according to the method above and analyzed.

Perfume Head Space Measurement

Perfume headspace was measured with GCMS (Agilent Technologies 7800B GC System, Agilent Technologies 5977B MSD, Column: Agilent Technologies 122-5532UI DB-5MS UI 30 m*0.250 mm, 0.25Micro, −60 to 325/350 C, SN: USN754641H, Gerstel MultiPurpose Sampler SPME (Solid Phase Micro Extraction) Fiber Assembly 50/30 um DVB/CAR/PDMS, Stableflex (2 cm) 23Ga, Autosampler, Gray-Notched, SUPELCO 57299-U).

Washed fabrics were cut into a dimension of 5 cm×8 cm then tucked into a 20 ml Headspace vial then capped. The capped vial is being equilibrated for 2 h under room temperature (25° C.) and loaded to GCMS for analysis.

To load headspace actives, the SPME fiber was extracting the headspace for 5 mins under room temperature then moved to GCMS injection port to desorb for 3 min under 270° C. The desorbed content was then put into GCMS for analysis with no split in GC and scan mode in MS. GCMS response data was processed & quantified by Agilent MassHunter Quantification software with quantification method, then analyzed using JMP.

EXAMPLES

Synthesis Example 1: Synthesis of Graft Copolymer

A graft polymer which is PVP/PVAc-g-PEG at a weight ratio of 20:30:50 ratio with a weight average molecular weight 16,800 Dalton was prepared as follows.

A polymerization vessel equipped with stirrer and reflux condenser was initially charged with 720 g of PEG (6000 g/mol) and 60 g 1,2-propane diol (MPG) under nitrogen atmosphere. The mixture was homogenized at 70° C.

Then, 432 g of vinyl acetate (in 2 h), 288 g of vinylpyrrolidone in 576 g of MPG (in 5 h), and 30.2 g of tert.-butyl perpivalate in 196.6 g MPG (in 5.5 h) were metered in. Upon complete addition of the feeds, the solution was stirred at 70° C. for 1 h. Subsequently, 3.8 g tert.-butyl perpivalate in 25.0 g MPG (in 1.5 h) were metered in followed by 0.5 h of stirring.

The volatiles were removed by vacuum stripping. Then, 676.8 g deionized water were added and a steam distillation was conducted at 100° C. for 1 h.

The temperature of the reaction mixture was reduced to 80° C. and 160.6 g of aqueous sodium hydroxide solution (50%, 40 mol % respective VAc) was added with maximum feed rate. Upon complete addition of the sodium hydroxide solution, the mixture was stirred for 1 h at 80° C. and subsequently cooled to ambient temperature.

The resulting graft polymer is characterized by a K-value of 24. The solid content of the final solution is 45%.

Example 1. Improved Efficacy of Benefit Agents by Adding Graft Copolymer in Laundry Detergent Composition Four (4) sample liquid laundry detergent compositions were prepared containing the following ingredients. Sample 1 does not contain graft polymer. Samples 2 to 4 contain a graft copolymer at different levels.

TABLE 1

| Ingredients (weight %) | Sample 1 | Sample 2 | Sample 3 | Sample 4 |
|---|---|---|---|---|
| Graft copolymer[1] | — | 0.4% | 0.7% | 1.5% |
| PEI polymer[2] | 1.5% | 1.5% | 1.5% | 1.5% |
| PEI polymer[3] | 2.3% | 2.3% | 2.3% | 2.3% |
| $C_{12}$-$_{14}EO_7$ | 6.2% | 6.2% | 6.2% | 6.2% |
| $C_{12}$-$_{14}AS$ | 5.3% | 5.3% | 5.3% | 5.3% |
| $C_{12}$-$_{14}AE_{1-3}S$ | 7.0% | 7.0% | 7.0% | 7.0% |
| $C_{11}$-$_{13}LAS$ | 9.7% | 9.7% | 9.7% | 9.7% |
| Perfume | 0.75% | 0.75% | 0.75% | 0.75% |
| Water | Balance | Balance | Balance | Balance |
| Notes | No Graft Copolymer | Graft copolymer (low level) | Graft copolymer (medium level) | Graft copolymer (high level) |

[1]Graft copolymer described in Synthesis Example 1 with PVP/PVAc-g-PEG at 20:30:50 ratio with MW 16,800 Dalton.
[2]Poly(ethyleneimine) ethoxylated polymer, from BASF

[3]Poly(ethyleneimine) ethoxylated-propoxylated polymer, from BASF

In accordance with Test 1: Perfume Head Space (B method) as described hereinabove, using the Tergotometer method to treat the fabrics, the content of perfume in the head space of the clothes washed by using these samples were measured. Such content indicates the efficacy of perfume expression on fabrics after being washed.

The results are shown in the Table 2 below, in which the liquid laundry detergent compositions containing graft copolymer show higher efficacy of perfume on fabrics after being washed compared to the liquid laundry detergent composition without a graft copolymer. Even more unexpectedly, Sample 2 and Sample 3 containing the graft copolymer at a relatively low level (0.4% and 0.7%) shows surprisingly higher efficacy of perfume compared to Sample 4 containing the graft copolymer at a relatively high level (1.5%). Furthermore, there are some perfume raw materials (PRM) that are preferentially expressed more with the lowest level of graft copolymer increases wet fabric headspace of some preferential perfume raw materials by about 20%.

TABLE 2

| Treatment | Sample 1 a | Sample 2 b | Sample 3 c | Sample 4 d |
|---|---|---|---|---|
| Overall Perfume Headspace (wet fabric) | 48.5 nmol/L | 52.5 nmol/La | 52.3 nmol/La | 49.6 nmol/L |
| Headspace Increase (wet fabric, %) | REFERENCE | +22% | +15% | +8% |

TABLE 2-continued

| Treatment | Sample 1 a | Sample 2 b | Sample 3 c | Sample 4 d |
|---|---|---|---|---|
| Notes | No Graft copolymer | Graft copolymer (low level) | Graft copolymer (medium level) | Graft copolymer (high level) |

Example 2: Improved Efficacy of Benefit Agents by Adding Graft Copolymer in Laundry Detergent Composition Four (4) sample liquid laundry detergent compositions were prepared containing the following ingredients. Sample 5 does not contain any polymer. Samples 6 and 7 contain a graft copolymer at two different levels. Sample 8 contains another type of polymer (i.e. PEI polymer).

TABLE 3

| Ingredients (weight %) | Sample 5 | Sample 6 | Sample 7 | Sample 8 |
|---|---|---|---|---|
| Graft copolymer[1] | — | 0.25% | 0.4% | — |
| PEI polymer[2] | — | — | — | 0.92% |
| $C_{12}$-$_{14}EO_7$ | 6.33% | 6.33% | 6.33% | 6.33% |
| $C_{12}$-$_{14}AE_{1-3}S$ | 3.97% | 3.97% | 3.97% | 3.97% |
| $C_{11}$-$_{13}LAS$ | 3.97% | 3.97% | 3.97% | 3.97% |
| $C_{12}$-$C_{18}$ Fatty Acid | 1.10% | 1.10% | 1.10% | 1.10% |
| Perfume | 0.4% | 0.4% | 0.4% | 0.4% |
| Water | Balance | Balance | Balance | Balance |
| Notes | No polymer | Graft copolymer (low level) | Graft copolymer (high level) | PEI polymer |

[1]Graft copolymer described in Synthesis Example 1 with PVP/PVAc-g-PEG at 20:30:50 ratio with MW 16,800 Dalton.
[2]Poly(ethyleneimine) ethoxylated polymer, from BASF In accordance with Test 1: Perfume Head Space (A method) as described hereinabove, the content of perfume in the head space of the clothes washed in washing machines by using these samples were measured. Such content indicates the efficacy of perfume expression on fabrics after being washed.

The results are shown in the table below, in which the liquid laundry detergent compositions containing graft copolymer show significantly higher efficacy of perfume on fabrics after being washed compared to the liquid laundry detergent composition without a polymer or containing a PEI polymer. Even more unexpectedly, Sample 6 containing the graft copolymer at a very low level (0.25%) shows even higher efficacy of perfume compared to Sample 7 containing the graft copolymer at a relatively high level (0.4%).

TABLE 4

| | Sample 5 | Sample 6 | Sample 7 | Sample 8 |
|---|---|---|---|---|
| Perfume Headspace (wet fabric) | 42.5 nmol/L | 53.5 nmol/L | 49.5 nmol/L | 47.5 nmol/L |
| Perfume Headspace (dry fabric) | 5.0 nmol/L | 5.9 nmol/L | 5.6 nmol/L | 5.6 nmol/L |
| Notes | No polymer | Graft copolymer (low level) | Graft copolymer (high level) | PEI polymer |

Example 3: Exemplary Formulations of Laundry Detergent Compositions Containing Graft Copolymer and Benefit Agents The following liquid laundry detergent compositions as shown in Tables 5 to 7 are made comprising the listed ingredients in the listed proportions (weight %).

TABLE 5

| Ingredients (weight %) | A | B | C | D | E | F |
|---|---|---|---|---|---|---|
| $C_{12}$-$_{14}AE_{1-3}S$ | 4 | 1.5 | 3 | 1 | 4 | 1.5 |
| $C_{11}$-$_{13}LAS$ | 2 | 3 | 5 | 1 | 2 | 3 |
| $C_{14}$-$_{15}EO_7$ | 10 | 8.5 | 15 | 12 | 5 | — |
| $C_{12}$-$_{14}EO_7$ | — | — | — | — | — | 8 |
| Graft Copolymer[1] | 0.05 | 0.09 | 0.17 | 0.13 | 0.15 | 0.29 |
| Citric acid | 2.4 | 0.5 | 4.8 | 0.6 | — | 2 |
| $C_{12}$-$C_{18}$ fatty acid | 3.2 | 1.2 | 2.2 | 2 | 1.5 | 1.2 |
| Na-DTPA | 1 | 0.05 | 0.5 | 0.18 | 0.06 | 0.2 |
| Sodium cumene sulphonate | — | — | — | 4.42 | — | — |

TABLE 5-continued

| Ingredients (weight %) | A | B | C | D | E | F |
|---|---|---|---|---|---|---|
| Ethanol | — | — | — | 1.74 | — | — |
| Silicone emulsion | — | 0.0025 | 0.0025 | 0.0025 | — | 0.0025 |
| Sodium polyacrylate | 1.4 | — | — | — | 1.4 | — |
| Polyethyleneimines | — | — | 1.0 | — | — | — |
| NaOH | Up to pH 8 | Up to pH 8 | Up to pH 8 | Up to pH 8 | Up to pH 8 | Up to pH 8 |
| Na Formate | — | — | — | 0.02 | — | — |
| Protease | — | — | 0.45 | 0.29 | — | — |
| Amylase | — | — | 0.08 | — | — | — |
| Dye | — | 0.002 | 0.002 | 0.001 | — | 0.002 |
| Perfume oil | — | 0.6 | 0.6 | 0.57 | — | 0.6 |
| Water | Balance | Balance | Balance | Balance | Balance | Balance |

[1]Graft copolymer described in Synthesis Example 1 with PVP/PVAc-g-PEG at 20:30:50 ratio with MW 16,800 Dalton.

TABLE 6

| Ingredients (weight %) | G | H | I | J | K | L |
|---|---|---|---|---|---|---|
| $C_{12}$-$_{14}AE_{1-3}S$ | 9 | 10 | 12 | 3 | 4 | 1.5 |
| $C_{11}$-$_{13}LAS$ | 2 | 3 | 5 | 12 | 9 | 15 |
| $C_{14}$-$_{15}EO_7$ | 5 | — | — | 3 | — | — |
| $C_{12}$-$_{14}EO_7$ | — | 3 | 4 | — | 3 | 8 |
| Graft Copolymer[1] | 0.5 | 0.1 | 0.7 | 0.3 | 0.5 | 0.6 |
| DTI polymer[2] | 1 | 2 | 5 | 0.5 | 0.7 | 3 |
| Citric acid | 2.4 | 0.5 | 4.8 | 0.6 | — | 2 |
| $C_{12}$-$C_{18}$ fatty acid | 3.2 | 1.2 | 2.2 | 2 | 1.5 | 1.2 |
| Na-DTPA | 1 | 0.05 | 0.5 | 0.18 | 0.06 | 0.2 |
| Sodium cumene sulphonate | — | — | — | 4.42 | — | — |
| Ethanol | — | — | — | 1.74 | — | — |
| Silicone emulsion | — | 0.0025 | 0.0025 | 0.0025 | — | 0.0025 |
| Sodium polyacrylate | 1.4 | — | — | — | 1.4 | — |
| Polyethyleneimines | — | — | 1.0 | — | — | — |
| NaOH | Up to pH 8 | Up to pH 8 | Up to pH 8 | Up to pH 8 | Up to pH 8 | Up to pH 8 |
| Na Formate | — | — | — | 0.02 | — | — |
| Protease | — | — | 0.45 | 0.29 | — | — |
| Amylase | — | — | 0.08 | — | — | — |
| Dye | — | 0.002 | 0.002 | 0.001 | — | 0.002 |
| Perfume oil | — | 2.0 | 0.6 | 1.5 | — | 0.8 |
| Water | Balance | Balance | Balance | Balance | Balance | Balance |

[1]Graft copolymer described in Synthesis Example 1 with PVP/PVAc-g-PEG at 20:30:50 ratio with MW 16,800 Dalton.

[2]DTI polymer, poly(1-vinylpyrrolidone-co-1-vinylimidazole), commercially available as Sokalan ® HP 56K from BASF

TABLE 7

| Ingredients (weight %) | M | N | O | P | Q | R |
|---|---|---|---|---|---|---|
| $C_{12}$-$_{14}AE_{1-3}S$ | 2.5 | 7.0 | 7.0 | 4.2 | 3.0 | 3.9 |
| $C_{12}$-$_{14}AS$ | 1.0 | 5.3 | 5.3 | 1.2 | — | — |
| $C_{11}$-$_{13}LAS$ | 10.7 | 9.7 | 9.7 | 5.4 | 4.2 | 3.9 |
| $C_{12}$-$_{14}EO_7$ | 10.8 | 6.2 | 6.2 | 5.4 | 3.0 | 5.9 |
| Graft Copolymer[1] | 0.30 | 0.75 | 0.50 | 0.75 | 0.40 | 0.50 |
| $C_{12}$-$C_{18}$ fatty acid | — | — | 2.0 | — | 2.6 | 1.1 |
| Na-DTPA | 0.05 | 0.05 | 0.05 | 0.18 | 0.64 | 0.09 |
| NaOH | Up to pH 8 | Up to pH 8 | Up to pH 8 | Up to pH 8 | Up to pH 8 | Up to pH 8 |
| Perfume oil | 0.75 | 1.0 | 0.75 | 1.5 | 1.0 | 0.8 |
| Additional ingredients (including water) | Balance | Balance | Balance | Balance | Balance | Balance |

[1]Graft copolymer described in Synthesis Example 1 with PVP/PVAc-g-PEG at 20:30:50 ratio with MW 16,800 Dalton.

Example 4: Exemplary Formulations of Unite Dose Laundry Detergent Compositions Containing Graft Copolymer and Benefit Agents The exemplary formulations as shown in Table 8 are made for unit dose laundry detergent. These compositions are encapsulated into compartment(s) of the unit dose by using a polyvinyl-alcohol-based film.

TABLE 8

| Ingredients (weight %) | S | T | U | V | W | X | Y |
|---|---|---|---|---|---|---|---|
| $C_{11}$-$C_{13}$ LAS | 8 | 6 | 5 | 1 | 8 | 6 | 5 |
| $C_{12}$-$C_{14}AE_3S$ | 6 | 10 | 5 | 2 | 6 | 10 | 5 |
| $C_{14}$-$C_{15}$EO7 | — | 6 | — | — | 9 | 10 | 11 |
| $C_{12}$-$C_{14}$EO7 | 18 | 25 | 16 | 18 | 9 | 15 | 5 |
| Graft Copolymer[1] | 2 | 0.1 | 0.5 | 0.7 | 1.0 | 0.4 | 1.5 |
| Citric acid | 0.5 | 0.7 | 1.1 | 0.5 | 0.5 | 0.7 | 1.1 |
| $C_{12}$-$C_{18}$ fatty acid | 0.5 | 2.4 | 0.5 | 4.8 | 0.5 | 2.4 | 0.5 |
| Sodium cumene sulphonate | 1.3 | — | 1.3 | 1.3 | 1.3 | 1.3 | 1.3 |
| Perfume oil | 0.3 | 1.5 | 2.5 | 3.0 | 4.0 | 0.8 | 1.0 |
| Solvent | Balance | Balance | Balance | Balance | Balance | Balance | Balance |

[1]Graft copolymer described in Synthesis Example 1 with PVP/PVAc-g-PEG at 20:30:50 ratio with MW 16,800 Dalton.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A laundry detergent composition, comprising:

1) from about 0.01% to about 0.75%, by weight of the composition, of a graft copolymer comprising:

a) polyalkylene oxide which has a number average molecular weight of from 1000 to 20,000 Daltons and is based on ethylene oxide, propylene oxide, butylene oxide or mixture thereof;

b)N-vinylpyrrolidone; and c) vinyl ester derived from a saturated monocarboxylic acid containing from 1 to 6 carbon atoms and/or a methyl or ethyl ester of acrylic or methacrylic acid;

wherein the weight ratio of (a):(b) is from 1:0.1 to 1:2, and wherein the amount, by weight, of (a) is greater than the amount of (c);

2) from about 0.001% to about 10%, by weight of the composition, of an encapsulated benefit agent comprising a perfume having a ClogP of from about 1.0 and to about 4.0.

2. The laundry detergent composition according to claim 1, wherein in the graft polymer a) the polyalkylene oxide comprises of ethylene oxide units or ethylene oxide units and propylene oxide units, and b) the vinyl ester comprises vinyl acetate.

3. The laundry detergent composition according to claim 1, wherein the polyalkylene oxide has a number average molecular weight of from about 2000 to about 15,000 Daltons.

4. The laundry detergent composition according to claim 1, wherein in the graft polymer, the weight ratio of (a):(c) is from about 1.0:0.1 to about 1.0:0.99.

5. The laundry detergent composition of claim 1, wherein in the graft polymer, the weight ratio of (a):(c) is from about 1.0:0.3 to about 1.0:0.9.

6. The laundry detergent composition according to claim 1, wherein in the graft polymer, from about 30 mol % to about 50 mol % of the grafted-on monomers of component (c) are hydrolyzed.

7. The laundry detergent composition according to claim 1, wherein the graft polymer has a weight average molecular weight of from about 8,000 Da to about 20,000 Da.

8. The laundry detergent composition according to claim 1, wherein the composition comprises:

from about 0.05% to about 0.5%, by weight of the composition, of the graft copolymer, and from about 0.008% to about 2%, by weight of the composition, of the benefit agent.

9. The laundry detergent composition according to claim 1, wherein the composition comprises:

from about 0.1% to about 0.29%, by weight of the composition, of the graft copolymer, and from about 0.01% to about 1%, by weight of the composition, of the encapsulated benefit agent.

10. The laundry detergent composition according to claim 1, wherein the perfume is selected from the group consisting of geraniol; menthol; (E,Z)-2,6-nonadien-1-ol; 3,6-nonadien-1-ol; 2,2-dimethyl-3-(3-methylphenyl)propan-1-ol; 2-methyl-3-[(1,7,7-trimethylbicyclo [2.2.1]hept-2-yl)oxy]

propan-1-ol; 2-methyl-4-[(1R)-2,2,3-trimethyl-3-cyclopenten-1-yl]-(2E)-buten-1-ol; ethyl trimethylcyclopentene butenol; 1-(4-propan-2-ylcyclohexyl)ethanol; 1-(2,2,6-trimethylcyclohexyl)hexan-3-ol; (Z)-3-methyl-5-(2,2,3-trimethyl-1-cyclopent-3-enyl)pent-4-en-2-ol; undecavertol; methyl dihydrojasmonate; (E,Z)-2,6-nonadien-1-al; cashmeran; iso cyclo citral; triplal; neobutenone alpha; delta damascone; alpha-pinyl isobutyraldehyde; vanillin; lilial; intreleven aldehyde; hexyl cinnamic aldehyde; adoxal; dupical; lyral; 2-tridecenal; methyl-nonyl-acetaldehyde; 4-tert-butylbenzaldehyde; dihydrocitronellal; citral; citronellal; isocyclocitral; 2,4,6-trimethoxybenzaldehyde; cuminic aldehyde; 2-methyloctanal; para tolyl acetaldehyde; o-anisaldehyde; anisic aldehyde; hexyl aldehyde; 2-methylpenanal; benzaldehyde; trans-2-hexenal; nonyl aldehyde; lauric aldehyde; beta ionone; koavone; tabanone coeur; zingerone; L-carvone; ionone gamma methyl; nectaryl; trimofix; farnesol; (E)-2-ethyl-4-(2,2,3-trimethyl-1-cyclopent-3-enyl) but-2-en-1-ol; 2-Methyl-4-[(1R)-2,2,3-trimethyl-3-cyclopenten-1-yl]-(2E)-buten-1-ol; nerol (800); ethyl vanillin; 4-(5,5,6-Trimethylbicyclo [2.2.1]hept-2-yl)cyclohexan-1-ol; octalynol 967544; (E)-3,3-dimethyl-5-(2,2,3-trimethyl-3-cyclopenten-1-yl)-4-penten-2-ol; 3-methyl-4-phenylbutan-2-ol; eugenol; 1-(2,2,6-trimethylcyclohexyl)hexan-3-ol; propenyl guaethol; 2-ethoxy-4-methylphenol; cyclopentol HC 937165; 3,7,11-Trimethyl-1,6,10-dodecatrien-3-ol; cedrol crude; 3,7-dimethyl-1,6-nonadien-3-ol (cis & trans); 1-methyl-3-(2-methylpropyl)cyclohexanol; 3,7-dimethyl-1,6-octadiene-3-ol; 2-(4-methyl-1-cyclohex-3-enyl)propan-2-ol; cyclohexanepropanol,2,2-dimethyl-, 3,7-dimethyl-1-octen-7-ol; Methyl ionone; isojasmone B 11; alpha-damascone; beta-damascone; fleuramone; 3-ethoxy-4-hydroxybenzaldehyde; formyltricyclodecan; 6-methoxy dicyclopentadiene carboxaldehyde; undecylenic aldehyde; 4-hydroxy-3-methoxybenzaldehyde; 8-,9 and 10-undecenal, mixture of isomers; trans-4-decenal; 4-dodecenal; 4-(octahydro-4,7-methano-5H-inden-5-yliden)butanal; 3-cyclohexene-1-propanal; beta,4-dimethyl-, 4,8-dimethyl-4,9-decadienal; 1-methylethyl-2-methylbutanoate; ethyl-2-methyl pentanoate; 1,5-dimethyl-1-ethenylhexyl-4-enyl acetate; p-metnh-1-en-8-yl acetate; 4-(2,6,6-trimethyl-2-cyclohexenyl)-3-buten-2-one; 4-acetoxy-3-methoxy-1-propenylbenzene; 2-propenyl cyclohexanepropionate; bicyclo[2.2.1] hept-5-ene-2-carboxylic acid,3-(1-methylethyl)-ethyl ester; bycyclo [2.2.1]heptan-2-ol, 1,7,7-trimethyl-, acetate; 1,5-dimethyl-1-ethenylhex-4-enylacetate; hexyl 2-methyl propanoate; ethyl-2-methylbutanoate; 4-undecanone; 5-heptyldihydro-2 (3h)-furanone;1,6-nonadien-3-01,3,7dimethyl-; 3,7-dimethylocta-1,6-dien-3-0; 3-cyclohexene-1-carboxaldehyde, dimethyl-; 3,7-dimethyl-6-octene nitrile; 4-(2,6,6-trimethyl-1-cyclohexenyl)-3-buten-2-one; tridec-2-enonitrile; patchouli oil; ethyl tricycle [5.2.1.0]decan-2-carboxylate; 2,2-dimethyl-cyclohexanepropanol; hexyl ethanoate, 7-acetyl, 1,2,3,4,5,6,7,8-octahydro-1,1,6,7-tetramethyl naphtalene; allyl-cyclohexyloxy acetate; methyl nonyl acetic aldehyde; 1-spiro [4,5]dec-7-en-7-yl-4-pentenen-1-one; 7-octen-2-ol,2-methyl-6-methylene-,dihydro; cyclohexanol,2-(1,1-dimethylethyl)-, acetate; hexahydro-4,7-methanoinden-5 (6)-yl propionatehexahydro-4,7-methanoinden-5 (6)-yl propionate; 2-methoxynaphtalene; 1-(2,6,6-trimethyl-3-cyclohexenyl)-2-buten-1-one; 1-(2,6,6-trimethyl-2-cyclohexenyl)-2-buten-1-one; 3,7-dimethyloctan-3-ol; 3-buten-2-one,3-methyl-4-(2,6,6-trimehtyl-1-cyclohexen-2-yl)-; hexanoic acid, 2-propenyl ester; (z)-non-6-en-1-al;1-decyl aldehyde; 1-octanal; 4-t-butyl-methylhydrocinnamaldehyde; alpha-hexylcinnamaldehyde; ethyl-2,4-hexadienoate; 2-propenyl 3-cyclohexanepropanoate; (5-methyl-2-propan-2-ylcyclohexyl) acetate; 3,7-dimethyloct-6-en-1-al; 2-(phenoxy)ethyl 2-methylpropanoate; prop-2-enyl 2-(3-methylbutoxy)acetate; 3-methyl-1-isobutylbutyl acetate; prop-2-enyl hexanoate; prop-2-enyl 3-cyclohexylpropanoate; prop-2-enyl heptanoate; (E)-1-(2,6,6-trimethyl-1-cyclohex-2-enyl) but-2-en-1-one; (E)-4-(2,6,6-trimethyl-1-cyclohex-2-enyl) but-3-en-2-one; (E)-3-methyl-4-(2,6,6-trimethyl-1-cyclohex-2-enyl)but-3-en-2-one; 1-(2,6,6-trimethyl-1-cyclohex-2-enyl)pent-1-en-3-one; 6,6,9a-trimethyl-1,2,3a,4,5,5a, 7,8,9,9b-decahydronaphtho [2,1-b]furan; pentyl 2-hydroxybenzoate; 7,7-dimethyl-2-methylidene-norbornane; (E)-1-(2,6,6-trimethyl-1-cyclohexenyl)but-2-en-1-one; (E)-4-(2,6,6-trimethyl-1-cyclohexenyl)but-3-en-2-one; 4-ethoxy-4,8,8-trimethyl-9-methylidenebicyclo [3.3.1] nonane; (1,7,7-trimethyl-6-bicyclo [2.2.1]heptanyl)acetate; 3-(4-tert-butylphenyl)propanal; 1,1,2,3,3-pentamethyl-2,5,6,7-tetrahydroinden-4-one; 2-oxabicyclo2.2.2octane, 1methyl4 (2,2,3trimethylcyclopentyl); [(Z)-hex-3-enyl]acetate; [(Z)-hex-3-enyl]2-methylbutanoate; cis-3-hexenyl 2-hydroxybenzoate; 3,7-dimethylocta-2,6-dienal; 3,7-dimethyloct-6-en-1-al; 3,7-dimethyl-6-octen-1-ol; 3,7-dimethyloct-6-enyl acetate; 3,7-dimethyloct-6-enenitrile; 2-(3,7-dimethyloct-6-enoxy)acetaldehyde; tetrahydro-4-methyl-2-propyl-2h-pyran-4-yl acetate; ethyl 3-phenyloxirane-2-carboxylate; hexahydro-4,7-methano-indenyl isobutyrate; 2,4-dimethylcyclohex-3-ene-1-carbaldehyde; hexahydro-4,7-methano-indenyl propionate; 2-cyclohexylethyl acetate; 2-pentylcyclopentan-1-ol; (2R,3R,4S,5S,6R)-2-[(2R,3S,4R,5R,6R)-6-(6-cyclohexylhexoxy)-4,5-dihydroxy-2-(hydroxymethyl) oxan-3-yl]oxy-6-(hydroxymethyl)oxane-3,4,5-triol; (E)-1-(2,6,6-trimethyl-1-cyclohexa-1,3-dienyl)but-2-en-1-one; 1-cyclohexylethyl (E)-but-2-enoate; dodecanal; (E)-1-(2,6,6-trimethyl-1-cyclohex-3-enyl)but-2-en-1-one; (5E)-3-methylcyclopentadec-5-en-1-one; 4-(2,6,6-trimethyl-1-cyclohex-2-enyl)butan-2-one; 2-methoxy-4-propylphenol; methyl 2-hexyl-3-oxocyclopentane-1-carboxylate; 2,6-dimethyloct-7-en-2-ol; 4,7-dimethyloct-6-en-3-one; 4-(octahydro-4,7-methano-5H-inden-5-yliden)butanal; acetaldehyde ethyl linalyl acetal; ethyl 3,7-dimethyl-2,6-octadienoate; ethyl 2,6,6-trimethylcyclohexa-1,3-diene-1-carboxylate; 2-ethylhexanoate; (6E)-3,7-dimethylnona-1,6-dien-3-ol; ethyl 2-methylbutanoate; ethyl 2-methylpentanoate; ethyl tetradecanoate; ethyl nonanoate; ethyl 3-phenyloxirane-2-carboxylate; 1,4-dioxacycloheptadecane-5,17-dione; 1,3,3-trimethyl-2-oxabicyclo [2,2,2]octane; [essential oil]; oxacyclo-hexadecan-2-one; 3-(4-ethylphenyl)-2,2-dimethylpropanal; 2-butan-2-ylcyclohexan-1-one; 1,4-cyclohexandicarboxylic acid, diethyl ester; (3aalpha,4beta, 7beta, 7aalpha)-octahydro-4,7-methano-3aH-indene-3a-carboxylic acid ethyl ester; hexahydro-4-7, menthano-1H-inden-6-yl propionate; 2-butenon-1-one, 1-(2,6-dimethyl-6-methylencyclohexyl)-; (E)-4-(2,2-dimethyl-6-methylidenecyclohexyl)but-3-en-2-one; 1-methyl-4-propan-2-ylcyclohexa-1,4-diene; 5-heptyloxolan-2-one; 3,7-dimethylocta-2,6-dien-1-ol; [(2E)-3,7-dimethylocta-2,6-dienyl]acetate; [(2E)-3,7-dimethylocta-2,6-dienyl] octanoate; ethyl 2-ethyl-6,6-dimethylcyclohex-2-ene-1-carboxylate; (4-methyl-1-propan-2-yl-1-cyclohex-2-enyl) acetate; 2-butyl-4,6-dimethyl-5,6-dihydro-2H-pyran; oxacyclohexadecen-2-one; 1-propanol,2-[1-(3,3-dimethylcyclohexyl)ethoxy]-2-methyl-propanoate; 1-heptyl acetate; 1-hexyl acetate; hexyl 2-methylpropanoate; (2-(1-ethoxyethoxy)ethyl) benzene; 4,4a,5,9b-tetrahydroindeno [1,2-d] [1,3]dioxine; undec-10-enal; 3-methyl-4-(2,6,6-trimethyl-2-cyclohexen-1-yl)-3-buten-2-one; 1-(1,2,3,4,5,6,7,8-octahydro-2,3,8,8-tetramethyl-2-naphthalenyl)-ethan-1-one; 7-acetyl, 1,2,3,4,5,6,7-octahydro-1, 1,6,7,-tetra methyl naphthalene; 3-methylbutyl 2-hydroxybenzoate; [(1R,4S, 6R)-1,7,7-trimethyl-6-bicyclo [2.2.1]heptanyl]acetate; [(1R, 4R,6R)-1,7,7-trimethyl-6-bicyclo [2.2.1]heptanyl]2-methylpropanoate; (1,7,7-trimethyl-5-bicyclo [2.2.1]heptanyl) propanoate; 2-methylpropyl hexanoate; [2-methoxy-4-[(E)-prop-1-enyl]phenyl]acetate; 2-hexylcyclopent-2-en-1-one; 5-methyl-2-propan-2-ylcyclohexan-1-one; 7-methyloctyl acetate; propan-2-yl 2-methylbutanoate; 3,4,5,6,6-pentamethylheptenone-2; hexahydro-3,6-dimethyl-2 (3H)-benzofuranone; 2,4,4,7-tetramethyl-6,8-nonadiene-3-one oxime; dodecyl acetate; [essential oil]; 3,7-dimethylnona-2,6-dienenitrile; [(Z)-hex-3-enyl]methyl carbonate; 2-methyl-3-(4-tert-butylphenyl)propanal; 3,7-dimethylocta-1,6-dien-3-ol; 3,7-dimethylocta-1,6-dien-3-yl acetate; 3,7-dimethylocta-1,6-dien-3-yl butanoate; 3,7-dimethylocta-1, 6-dien-3-yl formate; 3,7-dimethylocta-1,6-dien-3-yl 2-methylpropanoate; 3,7-dimethylocta-1,6-dien-3-yl propanoate; 3-methyl-7-propan-2-ylbicyclo [2.2.2]oct-2-ene-5-carbaldehyde; 2,2-dimethyl-3-(3-methylphenyl)propan-1-ol; 3-(4-tert-butylphenyl)butanal; 2,6-dimethylhept-5-enal; 5-methyl-2-propan-2-yl-cyclohexan-1-ol; 1-(2,6,6-trimethyl-1-cyclohexenyl)pent-1-en-3-one; methyl 3-oxo-2-pentylcyclopentaneacetate; methyl tetradecanoate; 2-methylundecanal; 2-methyldecanal; 1,1-dimethoxy-2,2,5-trimethyl-4-hexene; [(1S)-3-(4-methylpent-3-enyl)-1-cyclohex-3-enyl]methyl acetate; 2-(2-(4-methyl-3-cyclohexen-1-yl) propyl)cyclo-pentanone; 4-penten-1-one, 1-(5,5-dimethyl-1-cyclohexen-1-yl; 1H-indene-ar-propanal,2,3,-dihydro-1, 1-dimethyl-(9CI); 2-ethoxynaphthalene; nonanal; 2-(7,7-dimethyl-4-bicyclo [3.1.1]hept-3-enyl)ethyl acetate; octanal; 4-(1-methoxy-1-methylethyl)-1-methylcyclohexene; (2-tert-butylcyclohexyl) acetate; (E)-1-ethoxy-4-(2-methylbutan-2-yl)cyclohexane; 1,1-dimethoxynon-2-yne; [essential oil]; 2-cyclohexylidene-2-phenylacetonitrile; 2-cyclohexyl-1,6-heptadien-3-one; 4-cyclohexyl-2-methylbutan-2-ol; 2-phenylethyl 2-phenylacetate; (2E, 5E/Z)-5, 6,7-trimethyl octa-2,5-dien-4-one; 1-methyl-3-(4-methylpent-3-enyl)cyclohex-3-ene-1-carbaldehyde; methyl 2,2-dimethyl-6-methylidenecyclohexane-1-carboxylate; 1-(3,3-dimethylcyclohexyl)ethyl acetate; 4-methyl-2-(2-methylprop-1-enyl)oxane; 1-spiro (4.5)-7-decen-7-yl-4-penten-1-one; 4-(2-butenylidene)-3,5,5-trimethylcyclohex-2-en-1-one; 2-(4-methyl-1-cyclohex-3-enyl)propan-2-ol; 4-isopropylidene-1-methyl-cyclohexene; 2-(4-methyl-1-cyclohex-3-enyl)propan-2-yl acetate; 3,7-dimethyloctan-3-ol; 3,7-dimethyloctan-3-ol; 3,7-dimethyloctan-3-yl acetate; 3-phenylbutanal; (2,5-dimethyl-4-oxofuran-3-yl)acetate; 4-methyl-3-decen-5-ol; undec-10-enal; (4-formyl-2-methoxyphenyl) 2-methylpropanoate; 2,2,5-trimethyl-5-pentylcyclopentan-1-one; 2-tert-butylcyclohexan-1-ol; (2-tert-butylcyclohexyl)acetate; 4-tert-butylcyclohexyl acetate; 1-(3-methyl-7-propan-2-yl-6-bicyclo [2.2.2]oct-3-enyl)ethanone; (4,8-dimethyl-2-propan-2-ylidene-3,3a,4,5, 6,8a-hexahydro-1H-azulen-6-yl)acetate; [(4Z)-1-cyclooct-4-enyl]methyl carbonate; beta naphthol methyl ether; 1-methyl-4-(4-4-methylpentyl)cyclohex-3-ene-1-carbaldehyde-3,7-dimethylocta-1,6-dien-3-ol, and any mixtures thereof.

11. The laundry detergent composition according to claim 1, further comprising from 0.1% to about 50%, by weight of the composition, of a surfactant.

12. The laundry detergent composition according to claim 1, further comprising from about 1% to about 10%, by weight of the composition, of C6-C20 linear alkylbenzene sulfonate, and from about 1% to about 10%, by weight of the composition, of C6-C20 alkyl alkoxy sulfates, from about 1% to about 10%, by weight of the composition, of C6-C20 alkyl sulfates, or a combination thereof.

13. The laundry detergent composition according to claim 1, further comprising about 0.2% to about 4%, by weight of the composition, of a fatty acid.

14. The laundry detergent composition according to claim 1, wherein said composition is in the form of a liquid composition, a granular composition, a single-compartment pouch, a multi-compartment pouch, a sheet, a pastille or bead, a fibrous article, a tablet, a bar, flake, or a mixture thereof.

15. The laundry detergent composition according to claim 1, wherein in the graft polymer a) the polyalkylene oxide consists of ethylene oxide units or ethylene oxide units and propylene oxide units, and b) the vinyl ester consists of vinyl acetate.

16. The laundry detergent composition according to claim 1, further comprising silicones, lubricants, or a combination thereof.

* * * * *